United States Patent
Fukushi et al.

(10) Patent No.: US 10,358,584 B2
(45) Date of Patent: Jul. 23, 2019

(54) FLUOROPOLYMER BLEND AND ARTICLES THEREOF

(75) Inventors: Tatsuo Fukushi, Woodbury, MN (US); Haruhiko Miyazawa, Kanagawa (JP); Jun Fujita, Tokyo (JP); Atsushi Toyota, Kanagawa (JP); William M. Lamanna, Stillwater, MN (US); Shih-Hung Chou, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 156 days.

(21) Appl. No.: 13/808,395

(22) PCT Filed: Jul. 8, 2011

(86) PCT No.: PCT/US2011/043286
§ 371 (c)(1),
(2), (4) Date: Jan. 4, 2013

(87) PCT Pub. No.: WO2012/006487
PCT Pub. Date: Jan. 12, 2012

(65) Prior Publication Data
US 2013/0109790 A1    May 2, 2013

Related U.S. Application Data

(60) Provisional application No. 61/362,850, filed on Jul. 9, 2010.

(30) Foreign Application Priority Data

Jul. 9, 2010    (JP) .................. 2010-156618

(51) Int. Cl.
*C08K 5/19* (2006.01)
*C08K 5/34* (2006.01)
(Continued)

(52) U.S. Cl.
CPC ............... *C09J 127/20* (2013.01); *C08K 5/19* (2013.01); *C08K 5/34* (2013.01); *C08K 5/45* (2013.01);
(Continued)

(58) Field of Classification Search
CPC .......... C08L 27/12; C08L 27/14; C08L 27/16; C08L 27/18; C08L 27/20; C09J 127/12;
(Continued)

(56) References Cited

U.S. PATENT DOCUMENTS 3,931,129 A    1/1976    Kometani
4,123,603 A    10/1978   Stewart
(Continued)

FOREIGN PATENT DOCUMENTS

CN    101659817 A    *    3/2010
CN    102365816          2/2012
(Continued)

OTHER PUBLICATIONS

Fuller (Ionic Liquid-Polymer Gel Electrolytes. J. Electrochem. Soc., 144(4), 1997, pp. L67-L70).*
(Continued)

*Primary Examiner* — Brieann R Johnston
(74) *Attorney, Agent, or Firm* — Julie Lapos-Kuchar

(57) ABSTRACT

Described herein is a composition, article and method thereof, wherein the composition comprises (i) a fluoropolymer and (ii) an ionic liquid.

20 Claims, 3 Drawing Sheets

(51) Int. Cl.

| | |
|---|---|
| C08K 5/42 | (2006.01) |
| C08K 5/43 | (2006.01) |
| C08K 5/45 | (2006.01) |
| C08L 27/12 | (2006.01) |
| C09D 127/12 | (2006.01) |
| C09J 127/12 | (2006.01) |
| C09J 127/20 | (2006.01) |

(52) U.S. Cl.
CPC .......... *C09D 127/12* (2013.01); *C09J 127/12* (2013.01); *C08K 5/42* (2013.01); *C08K 5/43* (2013.01); *C08L 27/12* (2013.01)

(58) Field of Classification Search
CPC ...... C09J 127/14; C09J 127/16; C09J 127/18; C09J 127/20
USPC .... 524/84, 99, 106, 148, 167, 185, 520, 546
See application file for complete search history.

(56) References Cited

U.S. PATENT DOCUMENTS

| | | | | |
|---|---|---|---|---|
| 4,358,559 | A * | 11/1982 | Holcomb | C08K 5/0025 524/380 |
| 4,912,169 | A * | 3/1990 | Whitmire | C08F 220/12 525/208 |
| 5,175,223 | A | 12/1992 | Brinati et al. | |
| 5,208,638 | A * | 5/1993 | Bujese | G03G 15/0131 399/310 |
| 5,225,504 | A | 7/1993 | Tatsu et al. | |
| 5,552,199 | A | 9/1996 | Blong et al. | |
| 5,609,554 | A * | 3/1997 | Hayashi | B29C 44/0461 492/53 |
| 6,054,028 | A * | 4/2000 | Zingheim | H01B 7/0063 174/118 |
| 6,372,829 | B1 | 4/2002 | Lamanna et al. | |
| 2003/0099799 | A1 * | 5/2003 | Koike | B32B 1/08 428/36.91 |
| 2005/0143499 | A1 * | 6/2005 | Aoki | C08F 210/00 524/86 |
| 2010/0048829 | A1 | 2/2010 | D'Andola | |
| 2012/0018680 | A1 * | 1/2012 | Nakagawa | C08K 5/3445 252/500 |

FOREIGN PATENT DOCUMENTS

| | | | | |
|---|---|---|---|---|
| EP | 2 416 488 | | 2/2012 | |
| JP | H-5125202 | | 5/1993 | |
| JP | 8-134422 | | 5/1996 | |
| JP | 2004-043726 | | 2/2004 | |
| JP | 2006-128570 | | 5/2006 | |
| JP | 2006-137106 | | 6/2006 | |
| JP | WO 2009102077 | A1 * | 8/2009 | ............. B82Y 10/00 |
| JP | WO 2010113416 | A1 * | 10/2010 | ........... C08K 5/3445 |
| WO | WO 2001/25326 | | 4/2001 | |
| WO | WO 2006104701 | A1 * | 10/2006 | |

OTHER PUBLICATIONS

Atofina (Kynar & Kynar Flex PVDF: Performance Characteristics & Data. Atofina. Sep. 2001, 20 pages).*
Kim (N-Butyl-N-methylmorpholiumium bis(trifluoromethyanesulfonyl)imide-PVdF(HFP) gel electrolytes. Electrochimica Acta. 50, 2005, pp. 5673-5678).*
Leones (Effect of Ionic Liquid Anion Type in the Performance of Solid Polymer Electrolytes Based on Poly(Vinylidene fluoride-trifluoroethylene, Electroanalysis. 26, 2014, pp. 1-9).*
Machine translated English language equivalent of CN 101659817 (Mar. 2010, 8 pages).*
Bentz (Determination of Solubility Parameters of New Suit Materials. Performance of Protective Clothing: Second Symposium, ASTM STP 989. 1988, pp. 209-218).*
Machine translated English language equivalent of WO 2009/102077 (2009, 16 pages).*
Alger (Polymer Science Dictionary, 2017, p. 324).*
Keshavarz (A new method for assessment of glass transition temperature of ionic liquids from structure of their cations and anions without using any computer codes. J. Therm. Anal. Calorim., 2017, 130, pp. 2369-2387).*
Mawatara (Improved ionic conductivity of nitrile rubber/ionic liquid composites. Polymer, 2005, 46, pp. 3795-3800).*
Martinelli (Physical Properties of Proton Conducting Membranes Based on a Protic Ionic Liquid. J. Phys. Chem. B., 2007, 111, pp. 12462-12467).*
Yan (Enhanced Proton Conduction in Polymer Electrolyte Membranes as Synthesized by Polymerization of Protic Ionic Liquid-Based Microemulsions. Chem. Mater. 2009, 21, pp. 1480-1484).*
Jansen, et al., "High Ionic Liquid Content Polymeric Gel Membranes: Preparation and Performance", Macromolecules, vol. 44, No. 1, (Published on Web Dec. 14, 2010) pp. 39-45.
PCT International Search Report for PCT/US2011/043286 dated Feb. 23, 2013, 4 pages.
Bansal, D. et al., "Conductivities and Transport Properties of Gelled Electrolytes with and without an Ionic Liquid for Li and Li-ion Batteries," J. Phys. Chem. B. 2005, vol. 109, pp. 4492-4496.
M. Belmares et al., "Hildebrand and Hansen Solubility Parameters from Molecular Dynamics with Applications to Electronic Nose Polymer Sensors", J. Comp. Chem. vol. 25 (2004) p. 1814-1826.
Cinzia Chiappe and Daniela Pieraccini, "Ionic Liquids: Solvent properties and organic reactivity", J. Phys. Org. Chem. vol. 18 (2005), pp. 275-297.
Derecskei, Bela et al. "Molecular modeling simulations to predict density and solubility parameters of ionic liquids", Molecular Simulation, vol. 34, (2008), pp. 1167-1175.
Jansen, J.C. "High Ionic Liquid Content Polymeric Gel Membranes: Preparation and Performance.", Macromolecules, Dec. 14, 2010, vol. 43., pp. 39-45.
K.L. Hoy, "New Values of the Solubility Parameters From Vapor Pressure Data", J. Paint Tech. 42 (1970) p. 76-118.
Lu, J et al., "Advanced Applications of Ionic Liquids in Polymer Science," Prog. Polm. Sci., 2009, vol. 34, pp. 431-448.
Myers and Abu-Isa, "Elastomer Solvent Interactions III-Effects of Methanol Mixtures on Fluorocarbon Elastomers", Journal of Applied Polymer Science, vol. 32, (1986) pp. 3515-3539.
Scott, M.P. et al., "Application of ionic liquids as plasticizers for poly(methyl methacrylate)", Chemical Communications (2002), pp. 1370-1371.
Takeuchi, I et al., "Electrochemical Behavior of Fully Plastic Actuators Based on Bucky Gel Containing Various Internal Ionic Liquids", Electrochimica Acta, 2009, vol. 54, pp. 1762-1768.
Ueki, T. et al., "Macromolecules in Ionic Liquids: Progress, Challenges, and Opportunities", Macromolecules, 2008, vol. 41, pp. 3739-3749.
Watanae, Masayoshi et al., "Conductivity Study on Ionic Liquid/Polymer Complexes", Solid State Ionics, vol. 86-88 (1996), pp. 353-356.
S.L. Mayo et al., "Dreiding: A Generic Force Field for Molecular Simulations", J. Phys. Chem. 94 (1990). p. 8897-8909.
P.J. Stephens et al., J. Phys. Chem. 98 (1994), pp. 11623-11627.
M.M. Franci et al., "Selfconsistent molecular orbital methods. XXIII. A polarizationtype basis set for secondrow elements", J. Chem. Phys. 77 (1982) pp. 3654-3665.
L.E. Chirlian et al., "Atomic Charges Derived from Electrostatic Potentials" A Detailed Study, J. Comput. Chem. 8 (1987) pp. 894-905.
R.J. Woods et al., "Derivation of Net Atomic Charges from Molecular Electrostatic Potentials", J. Comput. Chem. 11 (1990) pp. 297-310.
C.M. Breneman et al., "Determining Atom-Centered Monopoles from Molecular Electrostatic Potentials. The Need for High Sampling Density in Formamide Conformational Analysis", J. Comput. Chem. 11 (1990) pp. 361-373.
N. Karasawa and W.A. Goddard, "Acceleration of Convergence for Lattic Sums", J. Phys. Chem. vol. 93 (1989) pp. 7320-7327.

(56) References Cited

OTHER PUBLICATIONS

B.J. Alder and T.E. Wainwright, "Studies in Molecular Dynamics, I. General Method", J. Chem. Phys, vol. 31 (1959) pp. 459-466.
A. Rahman, "Correlations in the Motion of Atoms in Liquid Argon", Phys. Rev. vol. 136 (1964) p. A405-A411.

* cited by examiner

FLUOROPOLYMER BLEND AND ARTICLES THEREOF

TECHNICAL FIELD

A composition comprising a blend of a fluoropolymer and an ionic liquid is described. In one embodiment, the composition is used as a fluoropolymer-based pressure sensitive adhesive.

BACKGROUND

Fluoroelastomers such as a copolymer of vinylidene fluoride (VDF) and hexafluoropropylene (HFP), and a terpolymer of tetrafluoroethylene (TFE), vinylidene fluoride (VDF), and hexafluoropropylene (HFP) have been used making seals, but their low temperature flexibility is not adequate for some seal applications.

There have been different approaches to improving the low temperature properties for fluoroelastomers.

U.S. Pat. No. 5,214,106 (Carlson et al.) describes substituting perfluoro alkyl vinyl ethers such as perfluoro methyl vinyl ether ($CF_2$=$CFOCF_3$) for the HFP in VDF/HFP/TFE (vinylidene fluoride/hexafluoropropylene/tetrafluoroethylene) copolymers to improve low temperature flexibility. However, these perfluorinated ethers can be expensive. U.S. Pat. No. 5,268,405 (Ojakaar et al.) discloses blending perfluoroelastomers with a perfluoropolyether in order to improve the low temperature properties of the composition. However, when the perfluoropolyether is mixed with a VDF/HFP/TFE copolymer, which has a glass transition temperature of −22° C., there is no improvement of glass transition temperature.

Further, although some literature references disclose improved low temperature properties of fluoroelastomeric compositions, the gum (i.e., the uncured fluropolymer) may not maintain the same low temperature properties upon curing. For example, U.S. Pat. No. 4,123,603 (Stewart) discloses a fluoroelastomer with improved low temperature properties by increasing VDF content in the polymer. Although the glass transition temperature of the polymer gum (VDF/HFP/TFE=60/28/12 wt %) in Example 1 of U.S. Pat. No. 4,123,603 was −27° C., the vulcanized compounded polymer with a bisphenol cure did not exhibit as low of a glass transition temperature as did the polymer gum according to a replicated example as shown in Example 3 of U.S. Pat. No. 5,175,223 (Brinati et al.).

In another application, a silicone-based pressure-sensitive adhesive is widely used as a pressure-sensitive adhesive having heat resistance. However, in the application to an electronic circuit or the like, particularly to a precision instrument and production process, such as hard disc drive (HDD), semiconductor devices (e.g. chemical vapor deposition(CVD) device) and electrodes (e.g. battery and fuel cell), when a silicone-based pressure-sensitive adhesive is used, a low molecular weight siloxane contained in the pressure-sensitive adhesive is released as an outgas into the atmosphere, and silicon dioxide produced resulting from oxidation of the siloxane gas sometimes causes a contact failure.

In order to avoid the above-described problem, development in an attempt to thermostabilize an acrylic pressure-sensitive adhesive that generates no siloxane gas is proceeding, but in view of the structure of a polymer component constituting the pressure-sensitive adhesive, heat resistance of an acrylic pressure-sensitive adhesive is generally far inferior to that of a silicon-based pressure-sensitive adhesive.

A fluorine-based material, such as fluororubber, is being used, for example, in an O-ring, a seal, a hose or a skid material and is excellent in mechanical property, heat resistance, weather resistance, chemical resistance and the like, but because of low adhesion, a pressure-sensitive adhesive composition having heat resistance and utilizing the characteristics of a fluororubber has been not obtained. To solve this problem, Japanese Unexamined Patent Publication No. 8-134422 has proposed a fluororubber-based pressure-sensitive adhesive composition with heat resistance, comprising 1) 100 parts by weight of a fluororubber polymer capable of peroxide crosslinking, 2) a catalytic amount of a peroxide, and 3) from 30 to 200 parts by weight of a fluororubber polymer incapable of peroxide crosslinking.

On the other hand, in a field completely different from a pressure-sensitive adhesive, development of an ionic liquid is proceeding. The ionic liquid that is also known as an ambient temperature molten salt, is liquid at normal temperature and due to its nonvolatility or high ion conductivity, is mainly used as an electrolytic solution in various electrochemical devices, such as a lithium secondary battery. In recent years, development of a gelled electrolyte using an ionic liquid is also studied for the purpose of preventing liquid leakage from a device. Furthermore, Japanese Patent No. 4597899 describes a gelled composition for heat dissipation, obtained by adding a thermally conductive inorganic filler and a gelling agent to an ionic liquid.

SUMMARY

There is a desire to identify a fluoropolymeric composition having low temperature properties, which may overcome some of the limitations as described above, namely, less expensive and easy to use, and provides lower glass transition temperatures, which, optionally, are maintained even after curing of the composition.

Further, there is a desire to provide a pressure-sensitive adhesive having excellent heat resistance. In one embodiment of this disclosure, a fluoropolymer as a low-adhesive material is combined with an ionic liquid, whereby the fluoropolymer is plasticized and as well, pressure-sensitive adhesive property is imparted to the composition obtained. At the same time, the composition can maintain heat resistance characteristic of the fluoropolymer, so that a pressure-sensitive adhesive composition having good pressure-sensitive adhesive characteristics and heat resistance can be obtained.

In one aspect, a composition is provided comprising (i) a fluoropolymer having a first glass transition temperature and (ii) an ionic liquid, wherein the blend of (i) and (ii) has a single, second glass transition temperature, which is different from the first glass transition temperature.

In one embodiment, the fluropolymer is a fluoroelastomer or a fluorothermoplastic.

In one embodiment, the fluoropolymer is derived from one or more fluorinated monomer(s) such as tetrafluoroethylene, vinyl fluoride, vinylidene fluoride, hexafluoropropylene, pentafluoropropylene, trifluoroethylene, trifluorochloroethylene, perfluoromethyl vinyl ether, perfluoropropyl vinyl ether, and a combination thereof.

In another aspect, a cured article is provided, comprising (i) a fluoropolymer having a first glass transition temperature and (ii) an ionic liquid, wherein the blend of (i) and (ii) has a single, second glass transition temperature, which is different from the first glass transition temperature.

In yet another aspect, a method is provided, comprising blending (i) a fluoropolymer having a first glass transition temperature and (ii) an ionic liquid, wherein the blend of (i) and (ii) has a single, second glass transition temperature, which is different from the first glass transition temperature.

In yet another aspect, a pressure-sensitive adhesive composition comprising a fluoropolymer and an ionic liquid is provided.

In yet another aspect, a sheet or tape having a layer comprising a fluoropolymer and an ionic liquid is provided.

The above summary is not intended to describe each embodiment. The details of one or more embodiments of the invention are also set forth in the description below. Other features, objects, and advantages will be apparent from the description and from the claims.

DETAILED DESCRIPTION

Figure 1:
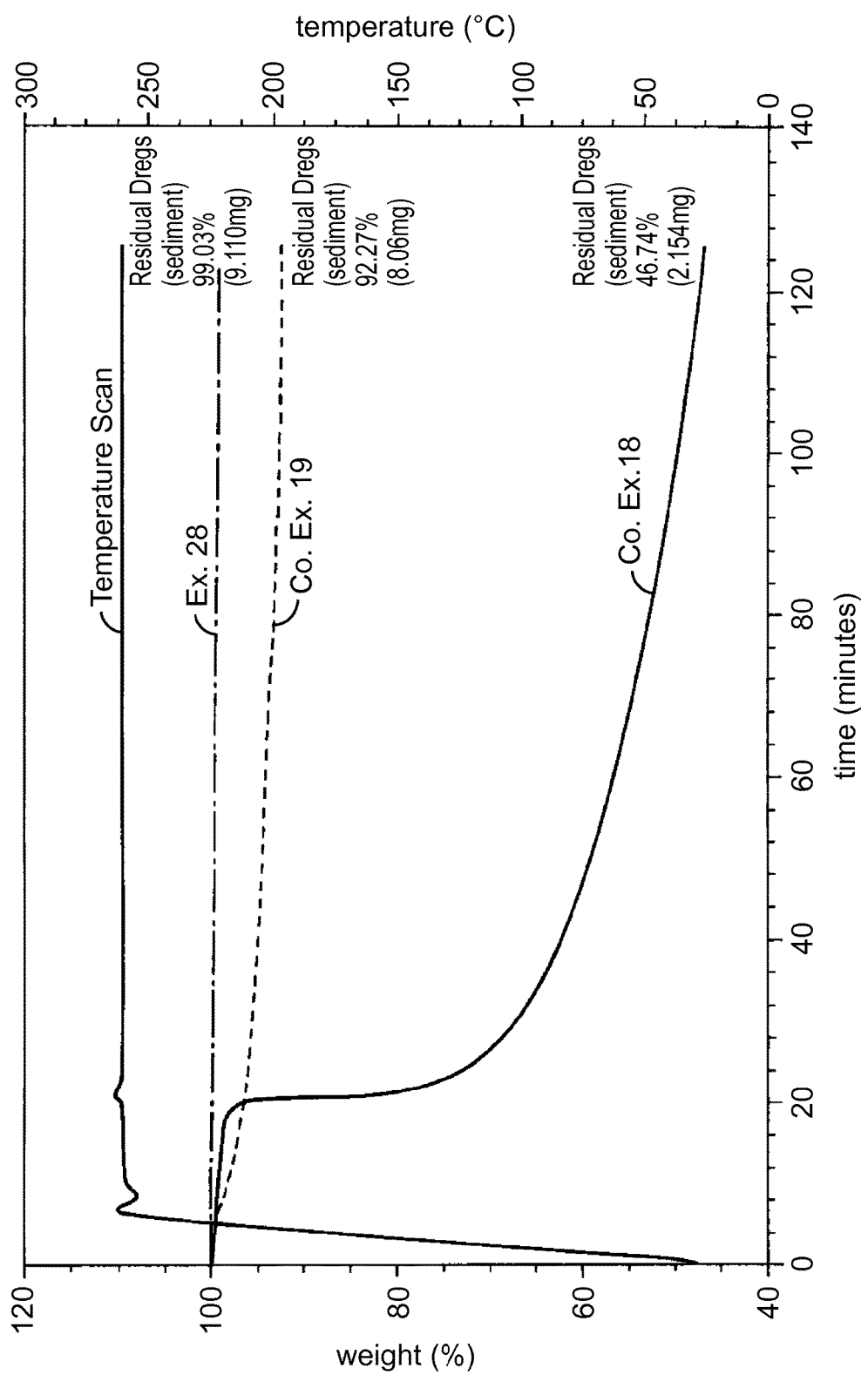
FIG. 1 is a thermogravimetric analysis (TGA) chart of Example 28 and Comparative Examples 18 and 19.

As used herein, the term
"a", "an", and "the" are used interchangeably and mean one or more;
"and/or" is used to indicate one or both stated cases may occur, for example A and/or B includes, (A and B) and (A or B); and
"copolymer" means a polymer derived from two or more monomeric units and includes terpolymers, quadpolymers, etc.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure is directed to a composition comprising an ionic liquid and a fluoropolymer. An ionic liquid is a unique salt, which is in a liquid state at about 100° C. or less, has negligible vapor pressure, and high thermal stability. The ionic liquid is composed of a cation and an anion and has a melting point of generally about 100° C. or less (i.e., being a liquid at about 100° C. or less), about 95° C. or less, or even about 80° C. or less. Certain ionic liquids exist in a molten state even at ambient temperature since their melting points are less than room temperature, and therefore they are sometimes referred to as ambient temperature molten salts. The cation and/or anion of the ionic liquid are relatively sterically-bulky, and typically one and/or both of these ions are an organic ion. The ionic liquid can be synthesized by known methods, for example, by a process such as anion exchange or metathesis process, or via an acid-base or neutralization process.

The cation of the ionic liquid of the present disclosure may be an ammonium ion, a phosphonium ion, a sulfonium ion or the like, including various delocalized heteroaromatic cations, but is not limited thereto. The ammonium ion includes an ammonium ion selected from the group consisting of alkylammonium, imidazolium, pyridinium, pyrrolidinium, pyrrolinium, pyrazinium, pyrimidinium, triazonium, triazinium, quinolinium, isoquinolinium, indolinium, quinoxalinium, piperidinium, oxazolinium, thiazolinium, morpholinium, piperazinium, and a combination thereof. Examples of the phosphonium ion include a phosphonium ion selected from the group consisting of tetraalkylphosphonium, arylphosphonium, alkylarylphosphonium and a combination thereof. Examples of the sulfonium ion include a sulfonium ion selected from the group consisting of alkylsulfonium, arylsulfonium, thiophenium, tetrahydrothiophenium, and a combination thereof. The alkyl group directly bonded to nitrogen atom, phosphorus atom, or sulfur atom may be a linear, branched or cyclic alkyl group having a carbon number of at least 1, 2, or even 4 and not more than 8, 10, 12, 15, or even 20. The alkyl group may optionally contain heteroatoms such as O and N and S in the chain or at the end of the chain (e.g., a terminal —OH group). The aryl group directly bonded to nitrogen atom, phosphorus atom or sulfur atom may be a monocyclic or condensed cyclic aryl group having a carbon number of at least 5, 6, or even 8 and not more than 12, 15, or even 20. An arbitrary site in the structure constituting such a cation may be further substituted by an alkyl group, an alkenyl group, an alkynyl group, a cycloalkyl group, an aryl group, an aralkyl group, an arylalkyl group, an alkoxy group, an aryloxy group, a hydroxyl group, a carbonyl group, a carboxyl group, an ester group, an acyl group, an amino group, a dialkylamino group, an amide group, an imino group, an imide group, a nitro group, a nitrile group, a sulfide group, a sulfoxide group, a sulfone group, a halogen atom or the like, and a heteroatom such as oxygen atom, nitrogen atom, sulfur atom and silicon atom may be contained in the main chain or ring of the structure constituting the cation.

Specific examples of the cation include N-ethyl-N'-methylimidazolium, N-methyl-N-propylpiperidinium, N,N,N-trimethyl-N-propylammonium, N-methyl-N,N,N-tripropylammonium, N,N,N-trimethyl-N-butylammoniuim, N,N,N-trimethyl-N-methoxyethylammonium, N-methyl-N,N,N-tris(methoxyethyl)ammonium, N,N-dimethyl-N-butyl-N-methoxyethylammonium, N,N-dimethyl-N,N-dibutylammonium, N-methyl-N,N-dibutyl-N-methoxyethylammonium, N-methyl-N,N,N-tributylammonium, N,N,N-trimethyl-N-hexylammonium, N,N-diethyl-N-methyl-N-(2-methoxyethyl)ammonium, 1-propyl-tetrahydrothiophenium, 1-butyl-tetrahydrothiophenium, 1-pentyl-tetrahydrothiophenium, 1-hexyl-tetrahydrothiophenium, glycidyltrimethylammonium, N-ethylacryloyl-N,N,N-trimethylammonium, N-ethyl-N-methylmorphonium, N,N,N-trioctylammonium, N-methyl-N,N,N-trioctylammonium, N,N-dimethyl-N-octyl-N-(2-hydroxyethyl)ammonium, and a combination thereof.

A cation not containing a functional group or moiety exhibiting reactivity (for example, an unsaturated bond having reaction activity) is advantageous in view of heat resistance, and examples of such a cation include N-methyl-N-propyl piperidinium and N,N,N-trimethyl-N-propylammonium. It is advantageous that the group constituting the cation is substituted with fluorine atoms, because good compatibility with a fluoropolymer is expected.

The anion of the ionic liquid of the present disclosure may be, for example, a sulfate (R—$OSO_3^-$), a sulfonate (R—$SO_3^-$), a carboxylate (R—$CO_2^-$), a phosphate ($(RO)_2P(=O)O^-$), a borate represented by the formula: $BR_4^-$, such as tetrafluoroborate ($BF_4^-$) and tetraalkylborate, a phosphate represented by the formula: $PR_6^-$, such as hexafluorophosphate ($PF_6^-$) and hexaalkylphosphate, an imide ($R_2N^-$), a methide ($R_3C^-$), nitrate ion ($NO_3^-$), or nitrite ion ($NO_2^-$). In the formula, each R may be independently a hydrogen atom, a halogen atom (fluorine, chlorine, bromine, iodine), a substituted or unsubstituted alkyl, alkenyl, alkynyl, cycloalkyl, aryl, aralkyl, arylalkyl, acyl or sulfonyl group, or the like. A heteroatom such as an oxygen atom, a nitrogen atom and a sulfur atom may be contained in the main chain or ring of the group R, and a part or all of hydrogen atoms on the carbon atom of the group R may be replaced with fluorine atoms. In the case where a plurality of R's are present in the anion, these R's may be the same or different. Because of good compatibility with fluoropolymer in general, it is advantageous that a part or all of hydrogen atoms on the carbon atom of the group R in the anion be replaced by fluorine atoms and it is advantageous that the anion contains a perfluoroalkyl group.

Examples of the anion containing a perfluoroalkyl group, which can be advantageously used, include a bis(perfluoroalkylsulfonyl)imide (($RfSO_2)_2N^-$), a perfluoroalkylsulfonate ($RfSO_3^-$) and a tris(perfluoroalkylsulfonyl)methide (($RfSO_2)_3C^-$) (wherein Rf represents a perfluoroalkyl group). The carbon number of the perfluoroalkyl group may be, for example, from at least 1, 2, 3 or even 4 to at most 8, 10, 12, 15, or even 20. Specific examples of the bis(perfluoroalkylsulfonyl)imide include: bis(trifluoromethanesulfonyl)imide, bis(pentafluoroethanesulfonyl)imide, bis(heptafluoropropanesulfonyl)imide and bis(nonafluorobutanesulfonyl)imide. Specific examples of the perfluoroalkylsulfonate include: trifluoromethanesulfonate, pentafluoroethanesulfonate, heptafluoropropanesulfonate and nonafluorobutanesulfonate. Specific examples of the tris(perfluoroalkylsulfonyl)methide include: tris(trifluoromethanesulfonyl)methide, tris(pentafluoroethanesulfonyl) methide, tris(heptafluoropropanesulfonyl)methide, tris(nonafluorobutanesulfonyl)methide, and a combination thereof.

As for the ionic liquid composed of the above-described cation and anion, N-methyl-N-propylpiperidinium bis(trifluoromethanesulfonyl)imide, N-methyl-N-propylpiperidinium bis(trifluoromethanesulfonyl)imide, N-ethyl-N'-methylimidazolium bis(trifluoromethanesulfonyl)imide, N,N,N-trimethyl-N-hexylammonium bis(trifluoromethanesulfonyl)imide and N-methyl-N,N,N-tributylammonium bis(trifluoromethanesulfonyl)imide can be advantageously used, because of excellent heat resistance and good compatibility with fluoropolymer. In the usage requiring non-coloration, N-methyl-N-propylpiperidinium bis(trifluoromethanesulfonyl)imide, N,N,N-trimethyl-N-hexylammonium bis(trifluoromethanesulfonyl)imide and N-methyl-N,N,N-tributylammonium bis(trifluoromethanesulfonylimide, which are free of an aromatic ring, are particularly suitable.

In the present disclosure, a fluoropolymer is blended with the ionic liquid. The fluoropolymer may be a fluoroelastomer or a fluorothermoplastic.

The fluoropolymer may be derived from one or more fluorinated monomer(s) such as tetrafluoroethylene (TFE), vinyl fluoride (VF), vinylidene fluoride (VDF), hexafluoropropylene (HFP), pentafluoropropylene, trifluoroethylene, trifluorochloroethylene (CTFE), perfluoromethyl vinyl ether (PMVE), perfluoropropyl vinyl ether (PPVE), and a combination thereof.

It is well known by those of skill in the art to modify fluoroelastomers during their formation by the addition of small amounts of other copolymerizable monomers, which may or may not contain fluorine substitution, e.g. ethylene, propylene, butylene and the like. Use of these additional monomers (i.e., comonomers) is within the scope of the present disclosure. Generally, these additional monomers would be used at less than 25 mole percent of the fluoropolymer, preferably less than 10 mole percent, and even less than 3 mole percent.

Exemplary fluoropolymers include: a TFE/propylene copolymer, a TFE/propylene/VDF copolymer, a VDF/HFP copolymer, a TFE/VDF/HFP copolymer, a TFE/PMVE copolymer, a TFE/$CF_2$=$CFOC_3F_7$ copolymer, a TFE/$CF_2$=$CFOCF_3$/$CF_2$=$CFOC_3F_7$ copolymer, a TFE/$CF_2$=C($OC_2F_5)_2$ copolymer, a TFE/ethyl vinyl ether (EVE) copolymer, a TFE/butyl vinyl ether (BVE) copolymer, a TFE/EVE/BVE copolymer, a VDF/$CF_2$=$CFOC_3F_7$ copolymer, an ethylene/HFP copolymer, a TFE/HFP copolymer, a CTFE/VDF copolymer, a TFE/VDF copolymer, a TFE/VDF/PMVE/ethylene copolymer, and a TFE/VDF/$CF_2$=$CFO(CF_2)_3OCF_3$ copolymer.

In one embodiment of the present disclosure, the fluoropolymer is a fluoroelastomer obtained generally by polymerizing one or more types of fully fluorinated or partially fluorinated monomers. The fluoropolymer may or may not be crosslinked. Crosslinking of the fluoroelastomer can be performed generally with a peroxide, a polyol or a polyamine, but is not limited thereto.

In another embodiment of the present disclosure, the fluoropolymer is a fluorothermoplastic obtained by polymerizing one or more types of fully fluorinated or partially fluorinated monomers. In this case, the specific microstructure of the fluoropolymer allows for a certain degree of crystallinity of the fluoropolymer, giving the thermoplastic properties. Generally, if a fluorothermoplastic is used, the fluorothermoplastic is a copolymer. Copolymerization allows for the decrease in crystallinity compared to the fluorine-based homopolymer, which can be advantageously used in the composition of this disclosure. A highly crystalline polymer has a tendency to exhibit poor compatibility with an ionic liquid, and therefore a fluorothermoplastic copolymer are advantageous in view of compatibility with an ionic liquid. The fluorothermoplastic may be crosslinked as described for the fluoroelastomers.

The fluoropolymer may be a mixture of chemically different fluorothermoplastics, as well as, mixtures of chemically different fluoroelastomers and mixtures of fluorothermoplastics and fluoroelastomers.

In the present disclosure, the fluoropolymer may be polymerized in the presence of a chain transfer agent and/or cure site monomers to introduce cure sites into the fluoropolymer.

Exemplary chain transfer agents include: an iodo-chain transfer agent, a bromo-chain transfer agent, or a chloro-chain transfer agent. For example, suitable iodo-chain transfer agent in the polymerization include the formula of $RI_x$, where (i) R is a perfluoroalkyl or chloroperfluoroalkyl group having 3 to 12 carbon atoms; and (ii) x=1 or 2. The iodo-chain transfer agent may be a perfluorinated iodo-compound. Exemplary iodo-perfluoro-compounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1,2,4-trichloroperfluorobutan, and mixtures thereof. In some embodiments, the bromine is derived from a brominated chain transfer agent of the formula: $RBr_x$, where (i) R is a perfluoroalkyl or chloroperfluoroalkyl group having 3 to 12 carbon atoms; and (ii) x=1 or 2. The chain transfer agent may be a perfluorinated bromo-compound.

The cure site monomers may be derived from one or more compounds of the formula: a) $CX_2$=$CX(Z)$, wherein: (i) X each is independently H or F; and (ii) Z is I, Br, $R_f$—U wherein U=I or Br and $R_f$=a perfluorinated or partially perfluorinated alkylene group optionally containing 0 atoms or (b) Y(CF$_2$)$_q$X, wherein: (i) Y is Br or I or Cl and (ii) q=1-6. In addition, non-fluorinated bromo- or iodo-olefins, e.g., vinyl iodide and allyl iodide, can be used. In some embodiments, the cure site monomers are derived from one or more compounds selected from the group consisting of CH$_2$=CHI, CF$_2$=CHI, CF$_2$=CFI, CH$_2$=CHCH$_2$I, CF$_2$=CFCF$_2$I, ICF$_2$CF$_2$CF$_2$CF$_2$I, CH$_2$=CHCF$_2$CF$_2$I, CF$_2$=CFCH$_2$CH$_2$I, CF$_2$=CFCF$_2$CF$_2$I, CH$_2$=CH(CF$_2$)$_6$CH$_2$CH$_2$I, CF$_2$=CFOCF$_2$CF$_2$I, CF$_2$=CFOCF$_2$CF$_2$CF$_2$I, CF$_2$=CFOCF$_2$CF$_2$CH$_2$I, CF$_2$=CFCF$_2$OCH$_2$CH$_2$I, CF$_2$=CFO(CF$_2$)$_3$—OCF$_2$CF$_2$I, CH$_2$=CHBr, CF$_2$=CHBr, CF$_2$=CFBr, CH$_2$=CHCH$_2$Br, CF$_2$=CFCF$_2$Br, CH$_2$=CHCF$_2$CF$_2$Br, CF$_2$=CFOCF$_2$CF$_2$Br, CF$_2$=CFCl, CF$_2$=CFCF$_2$Cl, and a combination thereof.

Additionally, nitrile cure site moieties may also be utilized, which along with compounds such as organometallic compounds of arsenic, antimony, and tin, can promote the formation of triazine rings by trimerization of nitriles under the influence of heat.

Such cure sites from the chain transfer agents and cure site monomers mentioned above are effective for curing with a peroxide, a polyol, and/or polyamine crosslinking agent.

Peroxide curatives include organic or inorganic peroxides. Organic peroxides are preferred, particularly those that do not decompose during dynamic mixing temperatures.

The crosslinking using a peroxide can be performed generally by using an organic peroxide as a crosslinking agent and, if desired, a crosslinking aid such as diallyl ether of glycerin, triallylphosphoric acid, diallyl adipate, diallylmelamine and triallyl isocyanurate (TAIC), tri(methyl)allyl isocyanurate (TMAIC), tri(methyl)allyl cyanurate, poly-triallyl isocyanurate (poly-TAIC), xylylene-bis(diallyl isocyanurate) (XBD), and N,N'-m-phenylene bismaleimide. Examples of the organic peroxide include benzoyl peroxide, dicumyl peroxide, di-tert-butyl peroxide, 2,5-di-methyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, O,O'-1,3-propanediyl OO,OO'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide. Other suitable peroxide curatives are listed in U.S. Pat. No. 5,225,504 (Tatsu et al.). The amount of peroxide curing agent used generally will be 0.1 to 5, preferably 1 to 3 parts by weight per 100 parts of fluoropolymer. Other conventional radical initiators are suitable for use with the present disclosure.

The crosslinking using a polyol is performed generally by using a polyol compound as a crosslinking agent, a crosslinking aid such as ammonium salt, phosphonium salt and iminium salt, and a hydroxide or oxide of a divalent metal such as magnesium, calcium, or zinc. Examples of the polyol compound include bisphenol AF, bisphenol A, bisphenol S, dihydroxybenzophenone, hydroquinone, 2,4,6-trimercapto-S-triazine, 4,4'-thiodiphenol, and a metal salt thereof.

The crosslinking using a polyamine is performed generally by using a polyamine compound as a crosslinking agent, and an oxide of a divalent metal such as magnesium, calcium, or zinc. Examples of the polyamine compound or the precursor of the polyamine compound include hexamethylenediamine and a carbamate thereof, 4,4'-bis(aminocyclohexyl)methane and a carbamate thereof, and N,N'-dicinnamylidene-1,6-hexamethylenediamine.

This crosslinking agent, crosslinking aid, and acid-receiving agent composed of a hydroxide, oxide or the like of a divalent metal each may be used in a conventionally known amount, and the amount used can be appropriately determined by one skilled in the art while taking into consideration the miscibility with fluoropolymer, mechanical strength of crosslinked fluoropolymer, profitability and the like. The amount used of each of these components participating in the crosslinking may be, for example, about 1 part by mass or more, about 5 parts by mass or more, about 10 parts by mass or more, or about 15 parts by mass or more, and about 60 parts by mass or less, about 40 parts by mass or less, about 30 parts by mass or less, or about 20 parts by mass or less, per 100 parts by mass of the fluoropolymer. The total amount of the components participating in the crosslinking may be, for example, about 1 part by mass or more, about 5 parts by mass or more, or about 10 parts by mass or more, and about 60 parts by mass or less, about 40 parts by mass or less, or about 30 parts by mass or less, per 100 parts by mass of the fluoropolymers.

The blending ratio of the fluoropolymer and the ionic liquid can be set to various ranges by taking into consideration the molecular weight and crosslinking/non-crosslinking of the fluoropolymer and the chemical properties such as, particularly, the kind of substituent of the cation and anion constituting the ionic liquid. Generally, based on 100 parts by mass in total of the fluoropolymer and the ionic liquid, the ratio of the fluoropolymer may be about 5 parts by mass or more, about 10 parts by mass or more, about 20 parts by mass or more, about 30 parts by mass or more, about 40 parts by mass or more, about 50 parts by mass or more, about 60 parts by mass or more, or about 70 parts by mass or more, and about 95 parts by mass or less, about 90 parts by mass or less, or about 80 parts by mass or less. The ratio of the ionic liquid may be about 0.01 parts by mass or more, about 1 parts by mass or more, about 10 parts by mass or more, about 25 parts by mass or more, about 40 parts by mass or more, about 50 parts by mass or more, about 60 parts by mass or more, or about 70 parts by mass or more, and about 95 parts by mass or less, about 90 parts by mass or less, or about 80 parts by mass or less.

For the purpose of, for example, enhancing the strength or imparting the functionality, conventional adjuvants, such as, for example, acid acceptors, process aids, or colorants may be added to the composition.

Such fillers include: an organic or inorganic filler such as clay, silica (SiO$_2$), alumina, iron red, talc, diatomaceous earth, barium sulfate, wollastonite (CaSiO$_3$), calcium carbonate (CaCO$_3$), calcium fluoride, titanium oxide, iron oxide and carbon black fillers, a polytetrafluoroethylene powder, an electrically conductive filler, a heat-dissipating filler, and the like may be added as an optional component to the composition. Those skilled in the art are capable of selecting specific fillers at required amounts to achieve desired physical characteristics in the vulcanized compound. The filler components may result in a compound that is capable of retaining a preferred elasticity and physical tensile, as indicated by an elongation and tensile strength value, while retaining desired properties such as retraction at lower temperature (TR-10).

Conventional adjuvants may also be incorporated into the composition of the present disclosure to enhance the properties of the resulting composition. For example, acid acceptors may be employed to facilitate the cure and thermal stability of the compound. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are preferably used in amounts ranging from about 1 to about 20 parts per 100 parts by weight of the polymer.

A solution or liquid dispersion containing the fluoropolymer, the ionic liquid and other components described above may be prepared using a solvent such as ketone (e.g., acetone, methyl ethyl ketone, methyl isobutyl ketone), ether (e.g., diethyl ether, tetrahydrofuran) and ester (e.g., ethyl acetate, butyl acetate), the solution or liquid dispersion prepared may be coated on the surface of a substrate such as paper, fiber, film, sheet, tape, plate, tube, pipe, tank and vessel, and the solvent may be removed by drying. In this way, an article containing a composition layer and a substrate can be formed.

The method for mixing the fluoropolymer, the ionic liquid and other components described above include, for example, kneading with use of a twin roll for rubber, a pressure kneader or a Banbury mixer. If a fluorothermoplastic is being used, the above processes may need to be conducted at a temperature above the melting point of the fluorothermoplastic's crystalline phase to facilitate mixing.

The mixture may then be processed and shaped such as by extrusion or molding to form an article of various shapes such as sheet, a hose, a hose lining, an o-ring, a gasket, or a seal composed of the composition of the present disclosure. The shaped article may then be heated to cure the gum composition and form a cured elastomer article.

Pressing of the compounded mixture (i.e., press cure) is typically conducted at a temperature of about 120-220° C., preferably about 140-200° C., for a period of about 1 minute to about 15 hours, usually for about 1-15 minutes. A pressure of about 700-20,000 kPa, preferably about 3400-6800 kPa, is typically used in molding the composition. The molds first may be coated with a release agent and prebaked.

The molded vulcanizate can be post cured in an oven at a temperature of about 140-240° C., preferably at a temperature of about 160-230° C., for a period of about 1-24 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 1 hour or more.

In one embodiment, the present disclosure is directed to a composition comprising a miscible blend of an ionic liquid with a fluoropolymer. As used herein, a miscible blend means the blend of the ionic liquid and the fluoropolymer is a molecular level dispersion, which is different from a microphase separation or dispersion, e,g, gel, and the miscible blend will behave as one component. In other words, the miscible blend will have a single glass transition temperature ($T_g$). In the present disclosure, the single $T_g$ of the miscible blend will be different from the $T_g$ of the fluoropolymer. If a blend of ionic liquid and fluoropolymer is immiscible, two $T_g$'s would be observed and at least one of the $T_g$'s would be the same as the $T_g$ for the fluoropolymer.

This $T_g$ effect by the ionic liquid can be called a "plasticizer effect." By plasticization, the glass transition temperature of the polymer will be shifted and thus the processability can be improved. The basic plasticizer requirements that must be met by a plasticizer are compatibility and permanence. The plasticizer must be miscible with the polymer.

One of the most important characteristics of plasticizer compounds is low volatility so that the polymer can remain flexible over a long lifetime without becoming brittle and failing as described in by M. P. Scott et al. in *Chemical Communications*. (2002) page 1370-1371. The negligible vapor pressure and outstanding thermal stability of an ionic liquid makes them an ideal plasticizer.

The miscible blend of ionic liquid and fluoropolymer exhibits an improved glass transition temperature as compared to the fluoropolymer itself. The glass transition temperature ($T_g$) is the temperature at which a polymer transitions from an amorphous state to a glassy state. The $T_g$ may be measured according to any technique known to those of ordinary skill in the art. For example differential scanning calorimetry (DSC), or determining the peak temperature of tan δ calculated from loss modulus (G″) divided by storage modulus (G′) (tan δ=G″/G′) using a dynamic mechanical analyzer may be used to determine the glass transition temperature. When using the same measuring technique, the $T_g$ of miscible blend according to the present disclosure (comprising the fluoropolymer and the ionic liquid) will be different from the $T_g$ of the fluoropolymer. A difference in the $T_g$, means that the $T_g$ of fluoropolymer blended with the ionic liquid is more than 3, 5, 7, 10, 15, 20, 25, 30, or even 40° C. lower than the $T_g$ of the fluoropolymer itself.

In one embodiment, the miscibility of the fluoropolymer with the ionic liquid may be determined by examining the solubility parameter of these components. Materials with similar solubility parameters can be miscible. For example, the solubility parameter, δ, of a fluoroelastomer (VDF/HFP=78/22 mol %) is 8.7 (cal/cc)$^{1/2}$ (Myers and Abu-Isa, *Journal of Applied Polymer Science*, Vol. 32, 3515-3539 (1986)). This fluoroelastomer (78 mol % VDF/22 mol % HFP) is miscible in solvents such as ketones and acetates. Examples of such solvents are 4-methyl-2-pentanone (MIBK), n-butyl acetate (BA), ethylacetate (EA), 2-butanone (MEK) and acetone.

In miscible blends of this disclosure, the absolute value of the solubility parameter difference between fluoropolymer (6a) and ionic liquid (60 may be less than or equal to 4 (cal/cc)$^{1/2}$ (i.e., the square root of calories per cubic centimeter), in other words, $$|\delta_a - \delta_b| \leq 4$$

Preferably the absolute value of the solubility parameter difference between fluoropolymer (6a) and ionic liquid (60 is less than or equal to 3 (cal/cc)$^{1/2}$ or even less than or equal to 2(cal/cc)$^{1/2}$.

The solubility parameter of ionic liquids can be calculated using computer simulation. See, for example, Bela Derecskei and Agnes Derecskei-Kovacs, "Molecular modelling simulations to predict density and solubility parameters of ionic liquids", *Molecular Simulation*, Vol. 34 (2008) 1167-1175.

In one embodiment of the present disclosure, the composition of the ionic liquid and the fluoropolymer is conductive. Surface conductivity of a polymer can be improved by mixing an ionic liquid even if it is not miscible with the polymer. Because the ionic liquid can be on the surface of the polymer, a phase separation may be helpful to achieve a higher surface conductivity. U.S. Pat. No. 6,372,829 (Lamanna et al.) discloses an antistatic composition by blending a thermoplastic polymer and an ionic liquid. The effectiveness of the antistatic can be measured as surface conductivity. It has been discovered that the blend of a fluoropolymer and an ionic liquid as disclosed in the present disclosure may have volume conductivity, which is different from surface conductivity.

The volume conductivity is a measure of the bulk conductivity through the body of the material, while the surface conductivity is measured along the surface of the material. Surface conductivity is the surface conductance multiplied by that ratio of specimen surface dimensions (distance between electrodes divided by the width of electrodes defining the current path) which transforms the measured conductance to that obtained if the electrodes had formed the opposite sides of a square. Volume conductivity is the volume conductance multiplied by that ratio of specimen volume dimensions (distance between electrodes divided by the cross-sectional area of the electrodes) which transforms the measured conductance to that conductance obtained if the electrodes had formed the opposite sides of a unit cube. See ASTM D257-07.

Volume conductivity of a blend between fluoropolymer and ionic liquid can be significantly increased when the blend is miscible. In one embodiment, the ionic liquid and the fluoropolymer mixed together has a volume conductivity of greater than $1 \times 10^{-10}$ seimens/meter, greater than $1 \times 10^{-8}$ seimens/meter, or even greater than $1 \times 10^{-6}$ seimens/meter when measured at 23° C. (approximately room temperature).

A typical way to increase a conductivity of fluoropolymer is to mix conductive carbons such as acethylene black and carbon black sold under the trade designation "KETJEN" with a fluoropolymer. See, for example, U.S. Pat. No. 5,552,199 (Blong et al.). However, having a volume conductivity fluoropolymer while maintaining optical clearness is difficult to obtain.

Ionic liquids are known as an ion conductive liquid. See, for example, Masayoshi Watanae and Tomoo, *Solid State Ionics*, vol. 86-88 (1996) 353-356. If the refractive index of ionic liquid is different form the refractive index of fluoropolymer, the blend between the ionic liquid and the fluoropolymer will not be optical clear. For example, the refractive index of N-ethyl-N'-methylimidazolium bis(trifluoromethanesulfonyl) imide (EIM-TFSI) is 1.423 (Cinzia Chiappe and Daniela Pieraccini, J. Phys. Org. Chem. 18 (2005) 275-297). Refractive indices of fluoropolymers depends on the monomer composition and the monomer composition ratio. For example, vinylidene fluoride-hexafluoropropylene (VDF/HFP=78/22 mol %) copolymer is 1.38.

In one embodiment of the present disclosure, the composition is not only volume conductive, but also maintains optical clearness/clarity (i.e., the composition is optically transparent).

Compositions of the present disclosure may be used in articles, such as a hose, a gasket, a seal, a clear coat, or an adhesive, such as a pressure-sensitive adhesive. These compositions may or may not be cured.

In one embodiment, the present composition may be used as a pressure-sensitive adhesive.

The term "pressure-sensitive adhesive property" as used in the context of the present disclosure indicates an adhesive property or a pressure-sensitive adhesive property (tackiness). The "adhesive property" means a property of a material being bonded to an object by contacting with the object, and even when a predetermined external force is applied to the material and/or the object, the positional relationship between the material and the object is substantially maintained or is recovered in a predetermined time. This applies also to a case where the material is disposed between two objects and these objects are bonded with each other. The predetermined external force and the predetermined time are dependent on the technical field, application or mode of use and may be in various degrees. The term "pressure-sensitive adhesive property" (sometimes called "tackiness") indicates a property of exhibiting an adhesive property when a small pressure is applied in a relatively short time.

The pressure-sensitive adhesive composition according to one embodiment of this disclosure contains a fluoropolymer and an ionic liquid as main components. The fluoropolymer is generally a low-adhesive material but can be plasticized by mixing it with an ionic liquid, and the fluoropolymer mixed with an ionic liquid exhibits a pressure-sensitive adhesive property. The ionic liquid generally has a low vapor pressure and a high thermal decomposition temperature, and therefore even when mixed with a fluoropolymer, does not substantially impair the heat resistance of a pressure-sensitive adhesive. Therefore, the pressure-sensitive adhesive composition according to one embodiment of this disclosure has excellent pressure-sensitive adhesive characteristics and high-temperature chemical stability.

In one embodiment of the present disclosure, the fluoropolymer contained in the pressure-sensitive adhesive composition is a fluoroelastomer (fluororubber) obtained generally by polymerizing one or more types of fluorinated or partially fluorinated monomers. The fluoroelastomer may or may not be crosslinked. Generally, when a crosslinked rubber is used, a pressure-sensitive adhesive composition having a high cohesive force can be formed. Crosslinking of a fluoroelastomer can be performed generally with a peroxide, a polyol or a polyamine, but the crosslinking form is not limited thereto. The pressure-sensitive adhesive composition may be formed using a crosslinked fluoroelastomer, or after forming a pressure-sensitive adhesive composition by using a fluoroelastomer in a non-crosslinked state, the pressure-sensitive adhesive composition may be crosslinked at the time of use or after use.

Such a fluoroelastomer includes a material containing one or more kinds of fluoroelastomer polymers, copolymers or terpolymers or their crosslinked products. In one embodiment, the fluoroelastomer is selected from the group consisting of a fluoroelastomer copolymer and a fluoroelastomer terpolymer. Examples of the fluoroelastomer copolymer and fluoroelastomer terpolymer include for example, out of Dyneon (registered trademark) produced by 3M, FE 5522X, FE 5730, FE 5830Q, FE 5840Q, FLS 2530, FLS 2650, FPO 3740, FPO 3741, FT 2320, FT 2350, FT 2430 and FT 2481 can be used as the fluoroelastomer terpolymer, and FC 2110Q, FC 2120, FC 2121, FC 2122, FC 2123, FC 2144, FC 2145, FC 2152, FC 2170, FC 2174, FC 2176, FC 2177D, FC 2178, FC 2179, FC 2180, FC 2181, FC 2182, FC 2211, FC 2230, FC 2260, FC 2261Q, FE 5520X, FE 5542X, FE 5610, FE 5610Q, FE 5620Q, FE 5621, FE 5622Q, FE 5623, FE 5640Q, FE 5641Q, FE 5642, FE 5643Q, FE 5660Q, FG 5630Q, FG 5661X, FG 5690Q, FX 3734, FX 3735 and FX 11818 can be used as the fluoroelastomer copolymer. Also a liquid fluoroelastomer Dyneon (registered trademark) FC 2110X (produced by 3M) can be mixed to the fluoroelastomers above. The Mooney viscosity (ML 1+10, 121° C.) of the non-crosslinked fluoroelastomer can be selected according to usage of the pressure-sensitive adhesive composition, but in general, one having a Mooney viscosity of 1 to 150 is used, and a plurality of polymers differing in the viscosity may be used in combination. The Mooney viscosity can be measured using a commercially available Mooney viscometer in accordance with JIS K6300-1 or ASTM D 1646-06.

In another embodiment of the present disclosure, the fluoropolymer contained in the pressure-sensitive adhesive composition is a thermoplastic fluoropolymer obtained by polymerizing one or more types of fluorinated or partially fluorinated monomers. In this case, the specific microstructure of the fluoropolymer allows for a certain degree of crystallinity of the fluoropolymer, giving the thermoplastic properties. Generally, if a thermoplastic fluoropolymer is used, the thermoplastic fluoropolymer is at least a copolymer, but may be a terpolymer or a thermoplastic fluoropolymer that contains even four or more different copolymerizable monomers. Copolymerization allows for the decrease in crystallinity compared to the fluorine-based homopolymer, which can be advantageously used in the pressure-sensitive adhesive composition of this disclosure. A resin having higher crystallinity generally tends to have a higher modulus at room temperature and a resin having an excessively high modulus is sometimes not applicable to the pressure-sensitive adhesive composition or fails in providing the desired pressure-sensitive adhesive property. Furthermore, a highly crystalline polymer has a tendency to exhibit poor compatibility with an ionic liquid, and therefore a fluoroelastomer copolymer and a fluoroelastomer terpolymer are advantageous also in view of compatibility with an ionic liquid. The thermoplastic fluoropolymer may be cross-linked as described for the fluoroelastomer based fluoropolymers. The fluoropolymer may be a mixture of chemically different thermoplastic fluoropolymers, as well as, mixtures of chemically different fluoroelastomers and mixtures of thermoplastic fluoropolymers and fluoroelastomers.

Unlike a general polar liquid, the ionic liquid sometimes exhibits hydrophobicity depending on the construction of cation and/or anion. For example, N-ethyl-N'-methylimidazolium bis(trifluoromethanesulfonyl)imide (EMI-TFSI) has a low water absorption rate compared to a $PF_6$ or $BF_4$ salt with the same cation. Accordingly, when a pressure-sensitive adhesive composition is formed using an ionic liquid exhibiting low water absorption, separation or falling off of the pressure-sensitive adhesive composition from the adherend and/or substrate, which may take place due to moisture resulting from vaporization at a high temperature, can be successfully prevented.

However, in the case where the molecular weight of the fluoropolymers is low, even when the fluoropolymer is blended in as large an amount as exceeding the range above, the obtained composition sometimes has a pressure-sensitive adhesive property and vice versa. It should be understood that such embodiments are not excluded from the scope of the present disclosure.

Additives having other functions, such as dye, pigment, flame retardant and antioxidant, those incurring no deterioration of heat resistance and/or pressure-sensitive adhesive property may be added.

The pressure-sensitive adhesive composition in one embodiment of this disclosure, containing a fluoropolymer, an ionic liquid and, if desired, other components described above, exhibits re-adhesion property. The term "re-adhesion" as used in this specification indicates a property such that after the pressure-sensitive adhesive composition is once adhered to an object and separated from the object, the pressure-sensitive adhesive composition keeps the pressure-sensitive adhesive property and again adheres to an object. The pressure-sensitive adhesive composition in one embodiment of this disclosure has high heat resistance, and therefore even after a heat treatment at about 260° C. or less, about 230° C. or less, or about 200° C. or less for about 10 hours or less, about 5 hours or less, or about 2 hours or less in an air atmosphere, assuming that the adhesive force at the first adhesion is 100%, the adhesive force at re-adhesion is 50% or more, 60% or more, 70% or more, or 80% or more. The "adhesive force" as used herein can be measured by variously setting the conditions such as adherend, peel angle and peeling speed according to usage, use mode and the like, but these conditions at the first adhesion and at the re-adhesion need to be the same. The pressure-sensitive adhesive composition in another embodiment of this disclosure can keep the pressure-sensitive adhesive property even after a heat treatment at a high temperature for a short time, for example, at about 260 to about 400° C. for about 1 to 60 minutes, and the pressure-sensitive adhesive composition in still another embodiment can keep the pressure-sensitive adhesive property at a low temperature for a long time, for example, at about 100 to about 200° C. for about 10 hours to several days or over several months. With respect to these embodiments, the re-adhesion property can also be evaluated by a relative ratio between the adhesive force at the first adhesion and that at the re-adhesion.

The method for molding the mixture include, for example, extrusion molding, calender molding and compression molding, and an article of various shapes such as sheet, tape and molded product, containing a layer of the pressure-sensitive adhesive composition or being composed of the pressure-sensitive adhesive composition, can be formed. If a thermoplastic fluoropolymer is being used, the above processes may need to be conducted at a temperature above the melting point of the thermoplastic fluoropolymer's crystalline phase to facilitate mixing.

When a sheet- or tape-shaped substrate is used, a pressure-sensitive adhesive sheet or tape with a pressure-sensitive adhesive composition layer can be obtained. The pressure-sensitive adhesive composition layer may also be provided on both surfaces of a sheet or tape to form a pressure-sensitive adhesive double-coated sheet or tape.

Examples of the sheet- or tape-shaped substrate which can be used include an engineering plastic film with excellent heat resistance, such as polyamide (PA) resin (e.g., PA6, PA46, PA66, PA11, PA12, PA610) and a copolymer thereof, semiaromatic PA (e.g., 6T/6I-based PI), wholly aromatic PA (aramid) (e.g., PAMXD6, PAMXD6-GF50), polyacetal, polycarbonate, modified polyphenylene ether, polyester resin (e.g., polyethylene terephthalate, polybutylene terephthalate, polyethylene naphthalate), fluoropolymer (e.g., polytetrafluoroethylene, polychlorotrifluoroethylene, polyvinyl fluoride, polyvinylidene fluoride, tetrafluoroethylene-fluoroalkyl vinyl ether copolymer, tetrafluoroethylene-hexafluoropropylene copolymer, ethylene-tetrafluoroethylene copolymer, ethylene-chlorotrifluoroethylene copolymer, tetrafluoroethylene-perfluorodioxole copolymer, polyvinylidene fluoride-hexafluoropropylene copolymer), polyphenylene sulfide, polysulfone, polyarylate, polyetherimide, polyethersulfone, polyether ketone, liquid crystal polymer, polyamideimide, polyimide, polystyrene and organic-inorganic composite obtained by adding an inorganic material to the polymer above; a metal such as aluminum, copper, silver, gold, nickel, zinc, platinum, chromium and iron, and an alloy thereof with other elements; graphite and a composite thereof with other resins; a ceramic such as soda glass, crystal glass and borosilicate glass; and a non-woven fabric composed of any one kind of the above material or a combination of two or more kinds of the above materials. In addition, not only engineering plastic film but also metal foils (aluminum, copper, Stainless steel and the like) are available.

In order to increase the bonding force of such a substrate to the pressure-sensitive adhesive composition layer, the substrate surface that comes into contact with the pressure-sensitive adhesive composition layer may be subjected to surface treatment of introducing a fluorine component. Examples of the surface treatment which can be used include plasma treatment using a fluorine-containing gas, and coating of a conventional fluorine-containing primer. The plasma treatment using a fluorine-containing gas can be performed, for example, by using octafluoropropane ($C_3F_8$) as the fluorine-containing gas, using, if desired, tetramethylsilane (TMS) and oxygen in combination, and flowing these gases at a flow rate of 50 to 500 SCCM in WAFR/BATCH 7000 Series manufactured by Plasma-Therm under the conditions of a chamber pressure of 10 to 1,000 mTorr, an output of 50 to 2,000 W and a treatment time of 0.1 to 10 minutes.

The adherend of the pressure-sensitive adhesive composition includes various materials such as glass, methacrylic resin (PMMA), polyimide resin, fluoropolymer such as polytetrafluoroethylene (PTFE), glass epoxy, aluminum foil, SUS, PTFE-coated SUS and silicon wafer, but for suitably utilizing the heat resistance of the present disclosure, it is preferred to select an adherend having heat resistance. In the case where a fluoropolymer such as PTFE is selected as the adherend, a relatively high adhesive force tends to be obtained, due to affinity for the fluoropolymer.

The pressure-sensitive adhesive composition of this disclosure and the article of various shapes such as sheet, tape and molded product, containing a layer of the pressure-sensitive adhesive composition and, if desired, a substrate, have excellent pressure-sensitive adhesive characteristics and high heat resistance. For example, lead-free soldering to which switching from Sn—Pb eutectic soldering is proceeding to comply with mandates regarding WEEE/RoHS involves a reflow temperature of about 260° C. that is about 30° C. higher than the conventional reflow temperature of about 230° C., and thus high heat resistance is required of an electronic component fixing material used during reflow. Furthermore, with the progress toward higher performance IC, the driving temperature of IC is becoming higher and higher, and the pressure-sensitive adhesive sheet used in such an environment is demanded to exert stable adhesive force even when exposed to a high temperature over a long period of time. The pressure-sensitive adhesive composition of this disclosure and an article containing the composition can be advantageously used particularly in such usage.

The uncured pressure-sensitive adhesive composition of this disclosure can also be used for coating to prepare cure-in-place gaskets (CIPG) or form-in-place gaskets (FIPG). An uncured coating of the pressure-sensitive adhesive composition can be deposited from a nozzle or die onto a substrates surface. After forming to a desired coating, the pressure-sensitive adhesive composition may be cured in place with a heat. Also the uncured pressure-sensitive adhesive composition can be cured in an oven.

The pressure-sensitive adhesive composition in one embodiment of this disclosure keeps the re-adhesion property even after exposure to a high temperature, and therefore can also be applied to the usage such as temporary fixing requiring releasing/re-adhesion, which cannot be coped with by the conventional heat-resistant epoxy adhesive.

The pressure-sensitive adhesive composition of this disclosure contains a fluoropolymer, and in turn, exhibits high affinity for a low surface energy material, so that the composition can be used as a pressure-sensitive adhesive that is applied to a low surface energy material including a fluoropolymer.

In addition, fluoropolymer generally has a low refractive index (below 1.40) in polymer and has high photo durability. The refractive index of the composition in this disclosure can be controlled easily by the content of ionic liquid, so that it is available for optical application.

The pressure-sensitive adhesive composition of this disclosure is applicable to the usage requiring high heat resistance but not requiring pressure-sensitive adhesive property during use, for example, as a buffer material between two substances. According to one embodiment of this disclosure, a sheet or tape having a layer containing the above-described fluoropolymer and ionic liquid is provided.

The following is a summary of particular embodiments of the present disclosure:

Embodiment 1

A composition comprising (i) a fluoropolymer having a first glass transition temperature and (ii) an ionic liquid, wherein the blend of (i) and (ii) has a single, second glass transition temperature, which is different from the first glass transition temperature.

Embodiment 2

The composition according to embodiment 1, wherein the fluoropolymer is a copolymer.

Embodiment 3

The composition according to any one of embodiments 1 or 2, wherein the ionic liquid has a melting point of about 100° C. or less.

Embodiment 4

The composition according to any one of the previous embodiments wherein the fluoropolymer is a fluoroelastomer or a fluorothermoplastic.

Embodiment 5

The composition according to any one of the previous embodiments, wherein the fluoropolymer derived from one or more fluorinated monomer(s) such as tetrafluoroethylene, vinyl fluoride, vinylidene fluoride, hexafluoropropylene, pentafluoropropylene, trifluoroethylene, trifluorochloroethylene, perfluoromethyl vinyl ether, perfluoropropyl vinyl ether, and a combination thereof.

Embodiment 6

The composition according to any one of the previous embodiments, wherein the fluoropolymer is a vinylidene fluoride/hexafluoropropylene copolymer, a tetrafluoroethylene/vinylidene fluoride/hexafluoropropylene copolymer, a tetraflurooethyleen/perfluoromethyl vinyl ether, a tetrafluoroethylene/propylene copolymer, or an ethylene/hexafluoropropylene copolymer.

Embodiment 7

The composition according to any one of the previous embodiments, wherein the anion of the ionic liquid comprises a perfluoroalkyl group.

Embodiment 8

The composition according to any one of the previous embodiments, wherein the cation portion of the ionic liquid is selected from N-ethyl-N'-methylimidazolium N-methyl-N-propylpiperidinium, N,N,N-trimethyl-N-propylammonium, N-methyl-N,N,N-tripropylammonium, N,N,N-trimethyl-N-butylammoniuim, N,N,N-trimethyl-N-methoxyethylammonium, N-methyl-N,N,N-tris(methoxyethyl)ammonium, N-methyl-N,N,N-tributylammonium, N,N,N-trimethyl-N-hexylammonium, N,N-diethyl-N-methyl-N-(2-methoxyethyl)ammonium, 1-propyl-tetrahydrothiophenium, 1-butyl-tetrahydrothiophenium, glycidyltrimethylammonium, N-ethyl-N-methylmorphonium, N,N,N-trioctylammonium, N-methyl-N,N,N-trioctylammonium, N-methyl-N,N,N-tributylammonium, N,N-dimethyl-N-octyl-N-(2-hydroxyethyl)ammonium, and a combination thereof.

Embodiment 9

The composition according to any one of the previous embodiments, wherein the anion portion of the ionic liquid is selected from bis(trifluoromethanesulfonyl) imide, bis(pentafluoroethanesulfonyl)imide, bis(heptafluoropropanesulfonyl)imide, bis(nonafluorobutanesulfonyl)imide, trifluoromethanesulfonate, pentafluoroethanesulfonate, heptafluoropropanesulfonate, nonafluorobutanesulfonate, tris(trifluoromethanesulfonyl)methide, tris(pentafluoroethanesulfonyl)methide, tris(heptafluoropropanesulfonyl)methide, tris(nonafluorobutanesulfonyl)methide, and a combination thereof.

Embodiment 10

The composition according to any one of the previous embodiments, wherein the fluoropolymer further comprises a cure site.

Embodiment 11

The composition according to embodiment 10, wherein the cure site is selected from cure site monomers derived from: $CF_2=CFBr$, $CF_2=CHBr$, $ICF_2CF_2CF_2CF_2I$, $CH_2I_2$, $BrCF_2CF_2Br$, $CF_2=CFO(CF_2)_3-OCF_2CF_2Br$, $CF_2=CFOCF_2CF_2Br$, $CH_2=CHCF_2CF_2Br$, $CH_2=CHCF_2CF_2I$, $CF_2=CFCl$, $CH_2=CHI$, $CF_2=CHI$, $CF_2=CFI$, $CH_2=CHCH_2I$, $CF_2=CFCF_2I$, $CF_2=CFCH_2CH_2I$, $CF_2=CFCF_2CF_2I$, $CH_2=CH(CF_2)_6CH_2CH_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3-OCF_2CF_2I$, $CH_2=CHBr$, $CH_2=CHCH_2Br$, $CF_2=CFCF_2Br$ or a combination thereof.

Embodiment 12

The composition according to any one of embodiments 10 and 11, wherein the fluoropolymer is peroxide curable.

Embodiment 13

The composition according to any one of the previous embodiments, further comprising a peroxide, and optionally, a crosslinking aid.

Embodiment 14

The composition according to embodiment 13, wherein the peroxide is selected from: benzoyl peroxide, dichlorobenzoyl peroxide, dicumyl peroxide, 2,5-dimethyl-2,5-di(tbutylperoxy)hexane, di-t-butyl peroxide, t-butylperoxy benzoate, 2,5-dimethyl-2,5-di(t-butylperoxy)hexane-3, laurel peroxide, and a combination thereof.

Embodiment 15

The composition according to any one of the previous embodiments comprising a filler.

Embodiment 16

The composition according to embodiment 15, wherein the filler is selected from clay, silica, talc, diatomaceous earth, barium sulfate, wollastonite, calcium carbonate, calcium fluoride, titanium oxide, iron oxide, and a combination thereof.

Embodiment 17

A cured article comprising the composition according to any one of embodiments 1-16.

Embodiment 18

An article comprising the composition according to any one of embodiments 1-16.

Embodiment 19

The article according to embodiment 18, wherein the article is a hose, a gasket, or a seal.

Embodiment 20

A method comprising blending (i) a fluoropolymer having a first glass transition temperature and (ii) an ionic liquid, wherein the blend of (i) and (ii) has a single, second glass transition temperature, which is different from the first glass transition temperature.

Embodiment 21

A composition comprising:
(i) from 5% to 95% by weight of a fluoropolymer versus the weight of the composition and wherein the fluoropolymer has a first solubility parameter, and
(ii) from 0.01% to 95% by weight of an ionic liquid versus the weight of the composition wherein the ionic liquid has a second solubility parameter and wherein the absolute value of the first solubility parameter minus the second solubility parameter is less than or equal to 4 $(cal/cc)^{1/2}$.

Embodiment 22

A pressure-sensitive adhesive composition comprising a fluoropolymer and an ionic liquid.

Embodiment 23

The pressure-sensitive adhesive composition as claimed in embodiment 22, wherein said fluoropolymer is selected from the group consisting of a fluoroelastomer copolymer and a fluoroelastomer terpolymer.

Embodiment 24

The pressure-sensitive adhesive composition as claimed in Embodiment 22, wherein said fluoropolymer is composed of one or more fluorinated monomer(s) selected from the group consisting of tetrafluoroethylene, vinyl fluoride, vinylidene fluoride, hexafluoropropylene, pentafluoropropylene, trifluoroethylene, trifluorochloroethylene, perfluoromethyl vinyl ether and perfluoropropyl vinyl ether.

Embodiment 25

The pressure-sensitive adhesive composition as claimed in Embodiment 22, wherein the anion of said ionic liquid contains a perfluoroalkyl group.

Embodiment 26

The pressure-sensitive adhesive composition as claimed in Embodiment 22, wherein the anion of said ionic liquid is selected from the group consisting of a bis(perfluoroalkylsulfonyl)imide anion and a perfluoroalkylsulfonate anion.

Embodiment 27

The pressure-sensitive adhesive composition as claimed in Embodiment 22, wherein even after a heat treatment at 260° C. or less for 10 hours or less in an air atmosphere, assuming that the adhesive force at the first adhesion is 100%, the adhesive force at re-adhesion is 50% or more.

Embodiment 28

An article comprising a layer of the pressure-sensitive adhesive composition claimed in any one of Embodiment 22 to 27.

Embodiment 29

The article as claimed in Embodiment 28, wherein the article further comprises a sheet- or tape-shaped substrate and said pressure-sensitive adhesive composition layer is disposed on said substrate.

Embodiment 30

The article as claimed in Embodiment 29, wherein said substrate contains a fluorine component at least in a surface coming into contact with said pressure-sensitive adhesive composition layer.

Embodiment 31

A sheet or tape having a layer comprising a fluoroelastomer and an ionic liquid.

Embodiment 32

An article comprising a layer of a cured or partially cured pressure sensitive adhesive composition claimed in any one of Embodiment 22 to 27.

Embodiment 33

A cure in place article derived from a composition comprising a curable pressure sensitive adhesive composition comprising a fluoropolymer and an ionic liquid.

Embodiment 34

A solution comprising a pressure sensitive adhesive composition claimed in any one of Embodiment 22 to 27.

Embodiment 35

A coating composition comprising the solution of Embodiment 34.

Embodiment 36

A cured coating composition comprising the solution of Embodiment 34.

Embodiment 37

A clear coating composition comprising the solution of Embodiment 34.

Embodiment 38

A cured clear coating composition comprising the solution of Embodiment 34.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, kg=kilograms, min=minutes, mol=mole, cal=calories, cc=cubic centimeter, cm=centimeter, cP=centiPoise, mm=millimeter, mL=milliliter, L=liter, N=Newton, psi=pressure per square inch, MPa=megaPascals, rad/s=radians per second, and wt=weight, Ex#=Example Number and Co. Ex. #=Comparative Example Number, and phr; parts by weight per one hundred parts by weight of rubber.

TABLE 1

Ionic Liquid

| IL No. | Cation | Anion | Chemical name |
|---|---|---|---|
| IL#1 | N1111 | TFSI | N,N,N,N-tetraammonium bis-(trifluoromethanesulfonyl) imide |
| IL#2 | N111(1O2) | TFSI | N-methoxyethyl-N,N,N-trimethylammonium bis-(trifluoromethanesulfonyl) imide |
| IL#3 | N1113 | TFSI | N-propyl-N,N,N-trimethylammonium bis-(trifluoromethanesulfonyl) imide |
| IL#4 | N1114 | TFSI | N-butyl-N,N,N-trimethylammonium bis-(trifluoromethanesulfonyl) imide |
| IL#5 | N1116 | TFSI | N-hexyl-N,N,N-tributylammonium bis-(trifluoromethanesulfonyl) imide |
| IL#6 | N1144 | TFSI | N,N-dibutyl-N,N-dimethylammonium bis-(trifluoromethanesulfonyl) imide |
| IL#7 | N114(1O2) | TFSI | N-butyl-N-dimethyl-N,N-methoxyethyllammonium bis-(trifluoromethanesulfonyl) imide |
| IL#8 | N122(1O2) | TFSI | N,N-Diethyl-N-methyl-N-(2-methoxyethyl)ammonium bis-(trifluoromethanesulfonyl) imide |
| IL#9 | N1333 | TFSI | N-methyl-N,N,N-tripropylammonium bis-(trifluoromethanesulfonyl) imide |
| IL#10 | N1444 | TFSI | N-methyl-N,N,N-tributylammonium bis-(trifluoromethanesulfonyl) imide |
| IL#11 | N144(1O2) | TFSI | N,N-dibutyl-N-methoxyethyl-N-methylammonium bis-(trifluoromethanesulfonyl) imide |
| IL#12 | N1(1O2)$_3$ | TFSI | N-methyl-N,N,N-trimethoxyethylammonium bis-(trifluoromethanesulfonyl) imide |
| IL#14 | N3333 | TFSI | N,N,N,N-tetrapropylammonium bis-(trifluoromethanesulfonyl) imide |
| IL#15 | N4444 | TFSI | N,N,N,N-tetrabutylammonium bis-(trifluoromethanesulfonyl) imide |
| IL#16 | EMI | TFSI | N-ethyl-N'-methylimidazolium bis(trifluoromethanesulfonyl) imide |
| IL#17 | PP13 | TFSI | N-Methyl-N-propylpiperidinium bis-(trifluoromethanesulfonyl) imide |
| IL#18 | TT4 | TFSI | S-butyl-tetrahydrothiophenium bis-(trifluoromethanesulfonyl) imide |
| IL#19 | TT5 | TFSI | S-pentyl-tetrahydrothiophenium bis-(trifluoromethanesulfonyl) imide |
| IL#20 | TT6 | TFSI | S-hexyl-tetrahydrothiophenium bis-(trifluoromethanesulfonyl) imide |
| IL#21 | GTA | TFSI | Glycidyltrimethylammonium bis-(trifluoromethanesulfonyl) imide |
| IL#22 | TMAEA | TFSI | N-Ethylacloyol-N,N,N-trimethylammonium bis-(trifluoromethanesulfonyl) imide |
| IL#23 | TT3 | BETI | S-butyl-tetrahydrothiophenium bis (pentafluoroethanesulfonyl) imide |
| IL#24 | N1888 | Me$_2$PO$_4$ | N-methyl-N,N,N-trioctylammonium dimethylphosphate |
| IL#25 | N122(1O2) | BF4 | N,N-Diethyl-N-methyl-N-(2-methoxyethyl)ammonium tetrafluoroborate |
| IL#26 | EMI | BF4 | N-ethyl-N'-methylimidazolium tetrafluoroborate |

TABLE 2

| Name | Source |
|---|---|
| Fluoroelastomer I | VDF/HFP copolymer available under the trade designation "DYNEON FC 2178" from 3M Co., St. Paul, MN comprising about 78 mol % VDF and about 22 mol % HFP |
| Fluoroelastomer II | VDF/HFP copolymer available under the trade designation "DYNEON FC 2122" from 3M Co., comprising about 78 mol % VDF and about 22 mol % HFP |
| Fluoroelastomer III | VDF/HFP copolymer available under the trade designation "DYNEON FC 2179" from 3M Co., comprising about 78 mol % VDF and about 22 mol % HFP |
| Fluoroelastomer IV | TFE/HFP/VDF terpolymer available under the trade designation "DYNEON FE 5540" from 3M Co., comprising about 9 mol % TFE, about 16 mol % HFP and about 75 mol % VDF |
| Fluoroelastomer V | VDF/HFP copolymer available under the trade designation "DYNEON FE 5610Q" from 3M Co., comprising about 78 mol % VDF and about 22 mol % HFP |

Preparation 1:

The ionic liquid IL #1 (N1111-TFSI) in Table 1 was prepared by adding an aqueous solution of 0.01 mol of N,N,N,N-tetramethyl ammonium chloride (available from Alfa Aesar, Ward Hill, Mass.) as the cation portion to an aqueous solution of 0.01 mol of lithium bis(trifluoromethanesulfonyl) imide (available under the trade designation "3M ELECTRONIC ADDITIVE HQ-115" from 3M Company, St. Paul, Minn.) as the anion portion. During adding the ammonium solution, a white solid precipitate was formed. The precipitate was dispersed in deionized water after the white precipitate was filtered and washed with deionized water. Ethyl acetate was added to the dispersion until the precipitate dissolved and a phase separation was observed. The upper solution (ethyl acetate phase) was collected using a separate funnel. After shaking and washing the solution with deionized water three times, the solution was dried in a vacuum oven and a white crystalline powder was obtained. The ionic liquids IL#13-15 were also prepared and purified as the same manner as ionic liquid IL#1 except either chloride or bromide of each corresponding salt was used as the cation portion.

Preparation 2:

The ionic liquid IL #2 (N111(1O2)-TFSI) in Table 1 was prepared by adding an aqueous solution of 0.01 mol of N-methoxyethyl-N,N,N-trimethyl ammonium chloride (available from Kanto Chemical, Japan) as the cation portion to an aqueous solution of 0.01 mol of lithium bis (trifluoromethanesulfonyl) imide (available under the trade designation "3M ELECTRONIC ADDITIVE HQ-115" from 3M Company, St. Paul, Minn.) as the anion portion. Ethyl acetate was added to the solution and a phase separation was observed. The upper solution (ethyl acetate phase) was collected using a separate funnel. After shaking and washing the solution with deionized water three times, the solution was dried in a vacuum oven and a white crystalline powder was obtained. The ionic liquids IL#4-6, IL#9 and IL#11-22 were also prepared and purified as the same manner as ionic liquid IL#2 except either chloride or bromide of each corresponding salt was used as the cation portion.

Preparation 3:

The ionic liquids IL#23, IL#24 and IL#28 were prepared and purified as the same manner of Preparation 2 except dimethylphosphate (Me2PO4) (available from Kanto Chemical, Japan), lithium bis (pentafluoroethanesulfonyl) imide (BETI) (available under the trade designation "3M ELECTRONIC ADDITIVE FC-130" from 3M Company, St. Paul, Minn.) and lithium trifluoromethanesulfonate (available under the trade designation "3M FC-122" from 3M Company, St. Paul, Minn.) was used as the anion portion, respectively.

Preparation 4:

The solubility of Fluoroelastomer I as a fluoropolymer was tested with various solvents, which have different solubility parameters. The solutions were prepared 20 g of Fluoroelastomer I with 80 g of solvent in a jar. After shaking it over night, Fluoroelastomer I completely dissolved in MIBK, BA, MEK and acetone, but Fluoroelastomer I did not dissolve in ethanol. The solution viscosity was tested using a DV-II viscometer (available from Brookfield Engineering Laboratories, Inc., Middleboro, Mass.) with LV4 spindle at 100 rpm. The test results were summarized in Table 3.

TABLE 3

| Solvent | Solubility parameter | | Solution viscosity (cP) |
|---|---|---|---|
| | $(cal/cc)^{1/2}$ | $MPa^{1/2}$ | |
| 4-methyl-2-pentanone (MIBK) | 8.4 | 17.2 | 2,172 |
| n-Butyl acetate (BA) | 8.5 | 17.4 | 3,430 |
| Ethylacetate (EA) | 9.1 | 18.6 | 3,509 |
| 2-butanone (MEK) | 9.3 | 19.0 | 3,629 |
| acetone | 10.0 | 20.5 | 1,614 |
| ethanol | 12.9 | 26.4 | not dissolved |

Calculation 1:

The following describes the methodology used to calculate solubility parameters in this invention using a computer simulation. The solubility parameter, δ, for a single component liquid is defined as $$\delta = \sqrt{\frac{[\Delta H_{vap} - RT]}{V_m}}$$

where $\Delta H_{vap}$ is the enthalpy of vaporization, R is the ideal gas constant, T is the temperature, and $V_m$ is the molar volume.

For non-associating fluids, which are defined here as systems whose vapor phase is well represented by isolated molecules, the enthalpy of vaporization is calculated from simulation as $$\Delta H_{vap} = \langle E_{liquid} \rangle - n \langle E_{monomer} \rangle + RT$$

where the brackets indicate an ensemble average, $E_{liquid}$ is the internal energy of the liquid, and $E_{monomer}$ is the internal energy of an isolated molecule. The average molar volume is also computed from the ensemble average of the density.

In the case of associating fluids, the vapor phase is not well represented by an isolated molecule, but rather by a distribution of small clusters. An example of a strongly associated fluid that has been difficult to define a consistent value of δ is acetic acid, which readily dimerizes in the vapor phase. For example, δ of acetic acid where the vapor phase is treated as an unassociated acid is 13.01, whereas δ is 9.19 $(cal/cc)^{1/2}$ if the vapor phase is comprised of acid dimers. See, for example, K. L. Hoy, J. Paint Tech. 42 (1970) 76.

Ionic liquids are an extreme case of strongly associating liquids, where the vapor phase would certainly be comprised of associated molecules. Therefore, for ionic liquids, we define $\Delta H_{vap}$ as $$\Delta H_{vap} = \langle E_{liquid} \rangle - n \langle E_{ion\ pair} \rangle + RT$$

where $E_{ion\ pair}$ is the ensemble average of an ion pair. The above modification has been incorporated into the cohesive energy density, CED, method for a reliable prediction of δ. See, for example, M. Belmares et al, J. Comp. Chem. 25 (2004) 1814. The CED method is defined by a sequence of seven simulation steps that are designed to rapidly bring the ensemble to mechanical and thermal equilibrium. The seven steps are;

1. Initialize the system at 40% of a target density and perform an energy minimization.
2. Equilibrate the system at 300 K.
3. Compress the system to the target density.
4. Compress the system to the 120% of the target density.
5. Relax all constraints and equilibrate the system at the desired temperature and pressure.
6. Perform a production run and use the configurations from this run to determine the properties of the liquid phase.
7. Calculate the vapor phase properties and combine these properties with step 6 to determine the solubility parameter.

For the molecular dynamics (MD) CED calculations, the MD engine as implemented in a Culgi software was employed. The Culgi (The Chemistry Univerfied language Interface) software used was version 4.0 and 5.0 (2004-2010), available from Culgi B.V., The Netherlands. For all of the steps, the Dreiding force field was used with a few specifications. See, for example, S. L. Mayo et al, J. Phys. Chem. 94 (1990) 8897. A quantum mechanics code called "Jaguar" to optimize the geometry of ionic liquid with +1 charged cation and −1 charged anion was used. The version of Jaguar is 7.7 and available from Schroedinger, LLC, New York, N.Y.

The electronic structure method employed from the charges is the B3LYP hybrid density functional theory method with basis set 6-31G. See, for example, P. J. Stephens et al., J. Phys. Chem. 98 (1994) 11623-11627 for the B3LYP hybrid density functional theory method and (M. M. Francl et al, J. Chem. Phys. 77 (1982) 3654 for basis set 6-31G.

The charges are computed by electrostatic potential fitting (ESP) with atom-centered point charges. See, for example, L. E. Chirlian, et al, J. Comput. Chem. 8 (1987) 894, R. J. Woods et al, J. Comput. Chem. 11 (1990) 297 and C. M. Breneman et al, J. Comput. Chem. 11 (1990) 361.

The van der Waals interactions and Coulomb interactions were truncated at 9 Å, and the long-range interactions (both van der Waals and electrostatics) were computed by Ewald summation method. See, for example, N. Karasawa and W. A. Goddard, J. Phys. Chem 93 (1989) 7320-7327. The van der Waals potential function used is LJ12-6-2. A further detailed simulation procedure of each step is as follows;

Step 1 is the initialization step, where 64 molecules (32 anions and 32 cations) are placed in a box that corresponds to 40% of the target density. The target density that was use in this work is 1.1 g/cc if the experimental density is not available. The molecules were placed randomly in this box and the energy was minimized.

In step 2, the initial system was equilibrated by running a constant particle, volume, and temperature (NVT) molecular dynamics (MD) simulation. See, for example, B. J. Alder and T. E. Wainwright, J. Chem. Phys. 31 (1959) 429 and A. Rahman, Phys. Rev. 136 (1964) A405.

To maintain a constant temperature during the MD simulation, the velocity was rescaled at a frequency of 10. The simulations were run for 40,000 MD steps where the time step used was 0.5 fs (femtoseconds). The full Lennard-Jones potential was used.

In step 3, the system was compressed to the target density while holding the temperature at 300 K. This was done by continuing to run in the NVT-ensemble and systematically compressing the density to the target density by increasing the density by 0.1 g/cc every 40,000 MD steps. The reduced cell coordinates were compressed. Once the target density was achieved, the simulation was run for another 40,000 MD steps.

In step 4, the target density was compressed to 120% of the target density by a method similar to that of step 3. The density was compressed by 0.1 g/cc every 40,000 MD steps and run an additional 40,000 MD steps at the compressed density while remaining in the NVT ensemble.

In step 5, a constant particle, pressure, and temperature (NPT) molecular dynamics were set as well as setting the temperature to 300 K and the pressure to 1 atm. The temperature was controlled with a Berendsen thermostat with a coupling parameter of 100 fs, and the pressure was controlled with a Berendsen barostat with coupling paramerater of 2000 fs. The system was equilibrated for 800,000 MD steps. See, for example, H. J. Berendsen, et al, J. R. 81 (1984) 3684.

In step 6, a 4,000,000 MD step simulation was run using the equilibrated system. The simulation parameters were the same in step 5. These configurations were used to compute the average molar volume and internal energy of the liquid phase. The averages were computed from every tenth sample.

In step 7, one cation and one anion were placed in a cubic box with an edge length of 40 Å and run at an 800,000 step NVT simulation to equilibrate the ion pair. A 4000,000 MD simulation was run to compute the average energy. Then the total solubility parameter was computed from $\langle V_m \rangle$, $\langle E_{liquid} \rangle$, and $\langle E_{ion\ pair} \rangle$. For each ionic liquid, this process was repeated five times with different initial packing and conformations. Solubility parameter for each ionic liquid was calculated as the average value from results of five MD simulations.

Example 1

Fluoroelastomer I in Table 2 was dissolved in ethyl acetate to produce a 20 mass % Fluoroelastomer I solution. A mixture solution was made by mixing 0.18 mL of Ionic Liquid IL#4 in Table 1 with 3 mL of the Fluoroelastomer I solution above to give a ratio of Fluoroelastomer I/ionic liquid=35/65 (by volume). Then the mixture solution was coated on a PET film (T60, available from Toray Industries, Inc., Japan) and ethyl acetate was removed by drying at 100° C. for 1 hour in an oven. The coated film was cooled at room temperature for 30 minutes. The compatibility was visually evaluated before and after removing the solvent. The coated layer was clear before and after removing the solvent. The solubility parameter was calculated by Culgi software (available from Culgi BV, Netherland) as described in Calculation 1 above. The calculated solubility parameter was 11.4 (cal./cc)$^{1/2}$ or 23.3 MPa$^{1/2}$.

Melting temperature ($T_m$) of ionic liquid was determined in accordance with ASTM D 793-01 and ASTM E 1356-98 by a Perkin-Elmer differential scanning calorimetry D6000 under nitrogen. The melting temperature ($T_m$) were obtained from the midpoint temperature of the peak obtained from −40° C. to 200° C. at a heating rate of 10° C./min. The results are shown in Table 4.

Examples 2-5

Mixtures between an ionic liquid and Fluoropolymer I were prepared and tested as Example 1 except that each corresponding ionic liquid as listed in Table 3 was used instead of ionic liquid IL#4. Ionic liquid #10 is available under the trade designation "3M IONIC LIQUID ANTI-STAT FC-4400" from 3M Company, St. Paul, Minn. All mixtures were clear before and after drying. The results are shown in Table 4.

TABLE 4

| | Ionic Liquid | | | | | | Miscibility | |
|---|---|---|---|---|---|---|---|---|
| | Ionic | | | | | Melting | | |
| Example | liquid | | | Solubility parameter | | point, $T_m$ | Before | After |
| No. | No. | Cation | Anion | (cal/cc)$^{1/2}$ | MPa$^{1/2}$ | (° C.) | drying | drying |
| Ex. 1 | IL#4 | N1114 | TFSI | 12.1 | 24.7 | 10 | clear | clear |
| Ex. 2 | IL#6 | N1144 | TFSI | 12.1 | 24.8 | 17 | clear | clear |
| Ex. 3 | IL#10 | N1444 | TFSI | 11.0 | 22.6 | 26 | clear | clear |
| Ex. 4 | IL#3 | N1113 | TFSI | 11.9 | 24.3 | 17 | clear | clear |
| Ex. 5 | IL#5 | N1116 | TFSI | 11.5 | 23.5 | 26 | clear | clear |
| Co. Ex. 1 | — | — | — | — | — | — | clear | clear |
| Co. Ex. 2 | IL#1 | N1111 | TFSI | 12.4 | 24.2 | 135 | clear | white |
| Co. Ex. 4 | IL#14 | N3333 | TFSI | 10.3 | 20.1 | 108 | clear | white |
| Co. Ex. 5 | IL#15 | N4444 | TFSI | 9.7 | 18.9 | 91 | clear | white |

— means not applicable

Comparative Example 1

A solution was prepared and tested as Example 1 except that the solution was made without an ionic liquid. The results are shown in Table 4.

Comparative Examples 2 and 4-5

Mixtures between an ionic liquid and Fluoroelastomer I were prepared and tested as in Example 1 except that instead of mixing 0.18 mL of ionic liquid to the Fluoroelastomer I solution, 0.227 grams of each of the corresponding ionic liquid listed in Table 4 were mixed into Fluoroelastomer I since the ionic liquids are solid at room temperature. Although the compatibility of the mixture samples was visually evaluated before and after removing the solvent as in Example 1, all of the mixtures became white after removing the solvent.

The mixtures of Examples 1 through 5 were miscible while Comparative Examples 2 through 5 were immiscible.

Examples 6 and 7

Mixtures between an ionic liquid and Fluoroelastomer I were prepared and tested as Example 1 except that each corresponding corresponding ionic liquid as listed in Table 4 were used instead of ionic liquid IL#4. The mixtures were clear before and after drying. The results are shown in Table 5.

Comparative Examples 6-8

Mixtures between an ionic liquid and Fluoroelastomer I were prepared and tested as Examples 6 and 7 except that ionic liquids IL#25, IL#26 (both are available from Kanto Chemical, Japan) and IL #27 were used respectively. The results are shown in Table 5.

TABLE 5

| | Ionic Liquid | | | | | | Miscibility | |
|---|---|---|---|---|---|---|---|---|
| | Ionic liquid | | | Solubility parameter | | melting point | Before | After |
| Examples | No. | Cation | Anion | (cal/cc)$^{1/2}$ | MPa$^{1/2}$ | (° C.) | drying | drying |
| Ex. 6 | IL#8 | N122(1O2) | TFSI | 12.0 | 24.4 | n/d | clear | clear |
| Ex. 7 | IL#16 | EMI | TFSI | 11.8 | 24.1 | −15 | clear | clear |
| Co. Ex. 6 | IL#25 | N122(1O2) | BF4 | 12.3 | 25.2 | 8 | phase separation | phase separation |
| Co. Ex. 7 | IL#26 | EMI | BF4 | 13.1 | 26.8 | 15 | phase separation | phase separation |
| Co. Ex. 8 | IL#27 | EMI | Otf | 12.3 | 25.2 | −17 | yellow | white | n/d: not detectable

Examples 8-17

Mixtures between an ionic liquid and Fluoropolyelastomer I were prepared and tested as Example 1 except that each corresponding corresponding ionic liquid as listed in Table 6 were used instead of ionic liquid IL#4. The mixtures were clear before and after drying. The results are shown in Table 6.

TABLE 6

| | Ionic liquid | | | | Miscibility | |
|---|---|---|---|---|---|---|
| | Ionic liquid | | | melting | Before | After |
| Examples | No. | Cation | Anion | point (° C.) | drying | drying |
| Ex. 8 | IL#2 | N111(1O2) | TFSI | 40 | clear | clear |
| Ex. 9 | IL#7 | N114(1O2) | TFSI | n/d | clear | clear |
| Ex. 10 | IL#9 | N1333 | TFSI | n/a | clear | clear |
| Ex. 11 | IL#12 | N1(1O2)$_3$ | TFSI | n/d | clear | clear |
| Ex. 12 | IL#17 | PP13 | TFSI | 10 | clear | clear |
| Ex. 13 | IL#18 | TT4 | TFSI | n/d | clear | clear |
| Ex. 14 | IL#19 | TT5 | TFSI | n/d | clear | clear |
| Ex. 15 | IL#20 | TT6 | TFSI | n/d | clear | clear |
| Ex. 16 | IL#23 | TT3 | BETI | 7 | clear | clear |
| Ex. 17 | IL#24 | N1888 | Me$_2$PO$_4$ | −17 | clear | clear |
| Co. Ex. 9 | IL#21 | GTA | TFSI | n/d | clear | white |
| Co. Ex. 10 | IL#22 | TMAEA | TFSI | n/a | clear | white | n/d: not detectable
n/a: not analyzed

Comparative Examples 9 and 10

Mixtures between an ionic liquid and Fluoroelastomer I were prepared and tested as Examples 6 and 7 except that ionic liquids IL#25 and IL#26 (both are available from Kanto Chemical, Japan) were used respectively. The results are shown in Table 6.

Examples 18

A solution was prepared by dissolving Fluoroelastomer I and Ionic Liquid IL#16 in ethyl acetate as the solvent in ajar. The jar was shaken for about 2 hours on a shaker. The ratio of fluoroelastomer to ionic liquid was 70/30 mass % and the ratio of fluoroelastomer/solvent was 20/80 mass %. The solution was coated onto a polyethylene terephthalate film and then was dried in an oven at 100° C. for one hour to remove the solvent from the blend.

The glass transition temperature was determined by a peak temperature of tan δ calculated from storage modulus (G') and loss modulus (G") using a dynamic mechanical analyzer, Advanced Rheometric Expansion System (ARES) instrument (manufactured by Rheometric Scientific, Piscataway, N.J.) in accordance with ASTM D 6204-07. A 7.9 mm parallel plate was used as a jig. The storage modulus (G') and loss modulus (G") were measured by a temperature sweep from −70° C. to 200° C. at the rate of 5° C. per minute and at the frequency (ω) of 1.0 Hz (6.3 rad/s). The test results are summarized in Table 6.

Example 19

The same procedure as described in Example 18 was used to prepare and test the sample, except the ratio of Fluoroelastomer I to Ionic liquid IL#16 was 40/60 mass %. The test results are summarized in Table 7.

Comparative Example 11

The same procedure as described in Example 18 was used to prepare and test the sample, except only Fluoroelastomer I was used (no ionic liquid). The test results are summarized in Table 7.

Example 20

The same procedure as described in Example 18 was used to prepare and test the sample, except Ionic liquid IL#10 was used. The test results are summarized in Table 7.

Example 21

The same procedure as described in Example 19 was used to prepare and test the sample, except Ionic liquid IL#10 was used. The test results are summarized in Table 7.

TABLE 7

| Sample | Blend ratio (wt %) Fluoro-elastomer I | Ionic Liquid IL#16 | Ionic Liquid IL#10 | Glass transition temperature (° C.) |
|---|---|---|---|---|
| Example 18 | 70 | 30 | — | −26 |
| Example 19 | 40 | 60 | — | −56 |
| Example 20 | 70 | — | 30 | −22 |
| Example 21 | 40 | — | 60 | −36 |
| Co. Example 11 | 100 | — | — | −12 |

— means not applicable

As shown in Table 7 above, Examples 18 to 21 shows a single glass transition temperature of the blends with ionic liquids and the glass transition temperatures are different than the fluoropolymer without an ionic liquid as Comparative Example 11.

Example 22

A fluoroelastomer compound was prepared using a 6 inch (1152.4 mm) two-roll mill by compounding Fluoroelastomer II with 30 parts of carbon black (available as Thermax MT, ASTM N990 from Cancarb, Medicine Hat, Alberta, Canada), 6 parts of calcium hydroxide (available as HP from The HallStar Company, Chicago, Ill.), 3 parts of magnesium oxide (available as Elastomag 170 from Akrochem Corp. Akron, Ohio), and 25 parts of Ionic liquid IL#10. The compound formulation is shown in Table 8.

The cure rheology of the sample was investigated by testing uncured, compounded mixtures using the Alpha Technology RPA 2000 with MDR (Moving Disk Rheometer) mode and the procedure described in ASTM D 5289-95 at 177° C., no preheat, 12 minute elapsed time and a 0.5° C. arc. minimum torque (ML) and maximum torque (MH), i.e., highest torque attained during specified period of time when no plateau or maximum was obtained were reported. Also reported were: is 2 (time for torque to increase 2 units above ML), t'50 (time for torque to reach ML+0.5[MH-ML]), and t'90 (time for torque to reach ML +0.9[MH-ML]). The fluoroelastomer compound in this example exhibited good curing properties.

The compound was press-cured for 10 minutes using a 15×15 cm, 2 mm thick mold at 177° C. Then the press-cured sheet was post cured at 230° C. for 16 hours. The dumbbells for physical properties were cut from the cured sheets with ASTM Die D. The press-cured and post-cured samples were tested for physical properties in accordance with ASTM D 412-06a.

Retraction at lower temperatures was determined using ASTM D 1329-02 with ethanol as the cooling media. TR10 is the temperature to 10% retraction and TR70 is the temperature to 10% retraction. Units are reported in ° C.

The volume conductivity of the sample was investigated by testing the cured sheet above using a resistance/resistivity prove (available as Model 803B from Electro-Tech Systems, Inc., Glenside, Pa.) using the procedure described in ASTM D 257-07 using 100 volts.

TABLE 8

| | Ex. 22 | Ex. 23 | Ex. 24 | Ex. 25 | Co. Ex. 12 | Co. Ex. 13 | Co. Ex. 14 |
|---|---|---|---|---|---|---|---|
| Fluoroelastomer II | 100 | — | — | — | 100 | — | — |
| Fluoroelastomer III | — | 100 | 100 | — | — | 100 | — |
| Fluoroelastomer IV | — | — | — | 100 | — | — | 100 |
| Cabon black N990 | 30 | 30 | 30 | 30 | 30 | 30 | 30 |
| Ca(OH)$_2$ | 6 | 6 | 6 | 6 | 6 | 6 | 6 |
| MgO | 3 | 3 | 3 | 3 | 3 | 3 | 3 |
| Ionic liquid IL#10 | 25 | 25 | 50 | 25 | — | — | — |
| Cure rheology 12 min@177° C. | | | | | | | |
| ML (in-lb) | 0.6 | 1.7 | 0.2 | 0.6 | 0.8 | 3.5 | 1.4 |
| MH (in-lb) | 8.6 | 22.3 | 10.1 | 9.7 | 7.9 | 26.6 | 21.8 |
| ts2 (min) | 0.3 | 0.4 | 0.7 | 0.5 | 1.2 | 1.3 | 1.3 |
| t50 (min) | 0.3 | 0.6 | 1.1 | 0.6 | 1.3 | 2.0 | 1.6 |
| t90 (min) | 1.4 | 1.0 | 2.4 | 0.8 | 2.1 | 2.9 | 2.0 |
| Press cure 5 min@177° C. | | | | | | | |
| Tensile strength at break (MPa) | 7.3 | 10.2 | 6.8 | 10.2 | 9.7 | 11.6 | 13.1 |
| Elongation at break (%) | 286 | 205 | 293 | 257 | 445 | 271 | 276 |
| 100% modulus (MPa) | 2.0 | 6.1 | 2.2 | 3.1 | 2.3 | 4.9 | 5.5 |
| Hardness | 49 | 71 | 51 | 56 | 68 | 74 | 74 |
| Volume conductivity, σ (S m$^{-1}$) | — | — | — | $7.2 \times 10^{-6}$ | — | — | $1.8 \times 10^{-10}$ |
| Post cure 4 hours@230° C. | | | | | | | |
| Tensile strength at break (MPa) | 11.3 | 12.5 | 7.8 | 8.9 | 13.8 | 17.6 | 16.3 |
| Elongation at break (%) | 240 | 136 | 171 | 168 | 288 | 209 | 206 |
| 100% modulus (MPa) | 3.0 | 9.4 | 3.6 | 3.7 | 2.7 | 6.6 | 6.9 |
| Hardness | 54 | 72 | 55 | 56 | 70 | 72 | 76 |
| Weight change (%) | −2 | −1.2 | −1.1 | 2.2 | −1 | −0.9 | 0.8 |
| Volume conductivity, σ (S m$^{-1}$) | — | — | — | $4.8 \times 10^{-6}$ | — | — | $4.5 \times 10^{-11}$ |
| Temperature retraction test | | | | | | | |
| TR10 (° C.) | −23.2 | −21.2 | −27.9 | −26 | −17.8 | −16.2 | −18.3 |
| TR70 (° C.) | −9.6 | 10.7 | −16.3 | −12.5 | 4.8 | −8.2 | −9.6 |

— means not applicable

As shown in Table 8 above, Examples 22 to 25 shows a lower retraction temperature of the blends with ionic liquids and the retraction temperatures are different than the fluoropolymer without an ionic liquid as Comparative Examples 12-14. Also the conductivity was improved with addition of the ionic liquid (Example 25 versus Comparative Example 13).

Example 26

The fluoroelstomer solution was prepared as Preparation 4. Fluoroelastomer I and 4-methyl-2-pentanone (MIBK) were mixed in a ratio of 30/70 (by mass) until Fluoroelastomer I was completely dissolved. Ionic liquid IL#16 was added to the solution in a ratio of Fluoroelastomer I/IL#16=100/30 (parts by mass) and mixed. The mixture was coated on a 25 μm thick polyimide film (available as under trade mark designation Kapton H from Du Pont-Toray Co., Ltd., Japan) by using a knife coater with a gap of 200 μm and then dried in an oven at 80° C. for 1 hour.

Example 27

The sample was prepared as Example 26 except Ionic Liquid IL #17 was used instead of Ionic Liquid IL #16.

Example 28

The sample was prepared as Example 27 except Fluoroelastomer V was used instead of Fluoroelastomer I and the coated sample further heated at 170° C. for 1 hour in an oven after drying.

Heat resistance of Fluoroelastomer V/IL#16 was tested by thermogravimetric analysis (TGA) was performed by the following procedure. The temperature was raised from room temperature to 260° C. at 40° C./min rate and then held at 260° C. for about 2 hours. The weight loss was measured to compare the residue. The results are shown in Table 9. FIG. 1 shows the weight loss versus time for Example 28 and Comparative Examples 18 and 19 and the temperature scan that was used in the TGA analysis.

Comparative Example 15

The sample was prepared as Example 28 except D620 plasticizer (molecular weight of approximately 800, a polyester adipate plasticizer available from J-PLUS Co., Ltd. in Japan) was used instead of Ionic Liquid IL#17. However, the coating layer has a phase separation and it was difficult to form a layer.

Comparative Example 16

The sample was prepared as Comparative Example 15 except a different ratio (fluoropolymer/polyester adipate plasticizer) of 80/20 parts by mass was used instead of a 70/30 ratio.

Comparative Example 17

The sample was prepared as Comparative Example 16 except D643 plasticizer (molecular weight of approximately 1,800, a polyester adipate plasticizer available from J-PLUS Co., Ltd. In Japan) was used instead of D620 plasticizer.

Comparative Example 18 a polyimide tape having an acrylic pressure-sensitive adhesive available under the trade designation "SCOTCH POLYIMIDE-TAPE #7416" by 3M Co. was used as a sheet having on one surface thereof a pressure-sensitive adhesive composition layer. For the TGA analysis only the acrylic-based pressure-sensitive adhesive layer was used for the test.

Comparative Example 19 a polyimide tape having a silicone-based pressure-sensitive adhesive available under the trade designation "SCOTCH POLYIMIDE-TAPE #5413" by 3M Co. was used as a sheet having on one surface thereof a pressure-sensitive adhesive composition layer. For the TGA analysis only the silicone-based pressure-sensitive adhesive layer was used for the test.

TABLE 9

| | Pressure-Sensitive Adhesive Composition | | Fluoropolymer/Ionic | |
|---|---|---|---|---|
| | Fluoropolymer | Ionic Liquid or plasticizer | Liquid (plasticizer) (parts by mass) | Residue (%) |
| Example 26 | Fluoroelastomer I | IL#16 | 100/30 | 98.2 |
| Example 27 | Fluoroelastomer I | IL#17 | 100/30 | 99.4 |
| Example 28 | Fluoroelastomer V | IL#17 | 35/65 | 99.0 |
| Comparative Example 15 | Fluoroelastomer V | D620 | 35/65 | Sample Not formed |
| Comparative Example 16 | Fluoroelastomer V | D620 | 80/20 | 84.2 |
| Comparative Example 17 | Fluoroelastomer V | D643 | 80/20 | 85.0 |
| Comparative Example 18 | acrylic-based pressure-sensitive adhesive | | — | 46.7 |
| Comparative Example 19 | silicon-based pressure-sensitive adhesive | | — | 92.3 |

In Comparative Example 18 (acrylic pressure-sensitive adhesive #7416), about 47% was detected as the residue and in Comparative Example 19 (silicone-based pressure-sensitive adhesive #5413), about 92% was detected as the residue, whereas in the pressure-sensitive adhesive compositions of Examples 26 to 28, from about 98 to 99% was detected as the residue, and thus the decrease of weight was kept as small as about 1 to 2%. In both Comparative Examples 16 and 17, which used a conventional plasticizer, a decrease of weight of about 15% was observed.

The adhesive force of the pressure-sensitive adhesive tape using the pressure-sensitive adhesive composition was measured at 25° C. with use of a tensile tester available under the trade designation "TENSILON RTG-1225" (manufactured by A&D Company, Ltd.) by peeling at 180° a pressure-sensitive adhesive tape of 50 mm or 25 mm in width at a peeling speed of 300 mm/min.

The pressure-sensitive adhesive sheet of Example 28 was cut out into a size of 60 mm (length)×50 mm (width) and laminated to SUS (stainless steel) under the conditions of one reciprocation using a 2 kg roller. Thereafter, the adhesive force was measured and found to be 0.15 N.

With respect to the pressure-sensitive adhesive characteristics of the pressure-sensitive adhesive composition, influence of the kind of adherend, the presence or absence of surface treatment of the polyimide substrate, and the presence or absence of aging was examined. In addition to the pressure-sensitive adhesive tape prepared by cutting out the pressure-sensitive adhesive sheet of Example 28 into a size of 60 mm (length)×25 mm (width), a pressure-sensitive adhesive tape using a mixture of Fluoroelastomer V and Fluoroelastomer I as the fluoropolymer (Example 29 below) was prepared as follows.

Example 29

Fluoroelastomer V or Fluoroelastomer I and MIBK were mixed in a ratio of 20/80 (by mass) and thoroughly mixed until the mixture was uniformly dissolved to prepare a Fluoroelastomer I 20% MIBK solution and a Fluoroelastomer V 20% MIBK solution. These two fluoropolymer 20% MIBK solutions were mixed in a ratio of 50/50 (by mass), and to the resulting fluoropolymer mixed solution ionic liquid IL#17 was added in a ratio of fluoropolymer/IL#17=35/65 (parts by mass) and mixed. The obtained mixture was coated on a polyimide substrate by using a knife coater with a gap of 200 μm, then dried in an oven at 80° C. for 1 hour and further heated in an oven at 170° C. for 1 hour to produce a sheet having on one surface thereof a pressure-sensitive adhesive composition layer.

A glass plate (soda lime glass, produced by Test-Piece KK), a Poly(methyl methacrylate) (PMMA) resin plate (MR200, produced by Mitsubishi Rayon Co., Ltd.), a polytetrafluoroethylene sheet (PTFE, Teflon (registered trademark) Tape TOMBO 9001, produced by Nichias Corp.), a glass epoxy resin plate (produced by Nihon Tact) and a PTFE-coated SUS plate (produced by Yoshida SKT Co., Ltd.) were used as the adherend. As for some samples, the pressure-sensitive adhesive tape was prepared after performing, as the surface treatment of the polyimide substrate, a plasma treatment using octafluoropropane ($C_3F_8$), tetramethylsilane (TMS) and oxygen (O2) under the following condition A or B.
Plasma Treatment Apparatus:
  WAF'R/BATCH 7000 Series, manufactured by Plasma-Therm Fluorine-containing gas: octafluoropropane ($C_3F_8$)
Condition A:
  Gas composition and flow rate: $C_3F_8$, 300 SCCM
  Chamber pressure: 300 mTorr
  Output: 100 W or 1500 W
  Treatment time: 1 minute
Condition B:
  Gas composition and flow rate: $C_3F_8$/TMS/$O_2$=150 SCCM/150 SCCM/15 SCCM
  Chamber pressure: 100 mTorr
  Output: 100 W or 1500 W
  Treatment time: 1 minute The pressure-sensitive adhesive tape was laminated to the adherend under the conditions of one reciprocation by using a 2 kg roller and left standing for 5 minutes or more, and thereafter, the adhesive force was measured and taken as the initial adhesive force. As for some samples, the adhesive force was measured after laminating the pressure-sensitive adhesive tape to the adherend and aging it in an oven at 260° C. for 10 hours. In addition, as for some samples subjected to aging, in order to examine the re-adhesion property, the pressure-sensitive adhesive tape measured for the adhesive force after aging was again laminated to an adherend under the conditions of one reciprocation by using a 2 kg roller and left standing for 5 minutes or more, and thereafter, the adhesive force was measured (180° peel, 300 mm/min.). The results are shown in Tables 10 and 11.

TABLE 10

| No. | Adherend | Plasma Treatment Conditions | | Adhesive Force (180° peel, N/25 mm) | | |
|---|---|---|---|---|---|---|
| | | Condition | Output (W) | Initial | After Aging | Aging + Re-adhesion |
| 1 | glass | — | — | 0.0502 | 1.04 | 0.0772 |
| 2 | | A | 100 | 0.0453 | 1.14 | — |
| 3 | | A | 1500 | 0.0676 | 0.946 | — |
| 4 | | B | 100 | 0.0243 | 1.10 | — |
| 5 | | B | 1500 | 0.0249 | 1.06 | 0.0884 |
| 6 | PMMA | — | — | 0.225 | — | — |
| 7 | | A | 100 | 0.393 | — | — |
| 8 | | A | 1500 | 0.574 | — | — |
| 9 | | B | 100 | 0.135 | — | — |
| 10 | | B | 1500 | 0.122 | — | — |
| 11 | PTFE | — | — | 0.577 | — | — |
| 12 | | A | 100 | 0.676 | — | — |
| 13 | | A | 1500 | 0.988 | — | — |
| 14 | | B | 100 | 0.316 | — | — |
| 15 | | B | 1500 | 0.302 | — | — |
| 16 | glass epoxy | — | — | 0.269 | — | — |

— means not applicable

TABLE 11

| No. | Adherend | Plasma Treatment Conditions | | Adhesive Force (180° peel, N/25 mm) | | |
|---|---|---|---|---|---|---|
| | | Condition | Output (W) | Initial | After Aging | Aging + Re-adhesion |
| 1 | Glass | — | — | 0.0941 | 0.872 | 0.248 |
| 2 | | A | 100 | 0.155 | 0.734 | 0.225 |
| 3 | | A | 1500 | 0.181 | 1.28 | 0.308 |
| 4 | PMMA | — | — | 1.57 | a | a |
| 5 | | A | 100 | 1.28 | a | a |
| 6 | | A | 1500 | 1.18 | a | a |
| 7 | PTFE | — | — | 1.84 | a | a |
| 8 | | A | 100 | 1.57 | a | a |
| 9 | | A | 1500 | 1.05 | a | a |
| 10 | glass epoxy | — | — | 0.411 | a | a |
| 11 | | A | 1500 | 0.673 | a | a |
| 12 | PTFE-coated SUS | — | — | 2.01 | 1.83 | — |
| 13 | | A | 1500 | 1.45 | 4.53 | — | a: Unmeasurable due to breakage of substrate.

With respect to samples prepared by laminating the pressure-sensitive adhesive tape of Example 28, the acrylic-based pressure-sensitive adhesive of Comparative Example 18 or the silicone-based pressure-sensitive adhesive of Comparative Example 19 were adherend to a slide glass, the temperature was raised to 260° C. from room temperature over 1 hour, kept at 260° C. for 10 hours and then returned to room temperature, and the change in outer appearance between before and after the test and the presence or absence of re-adhesion property were evaluated. The results are shown in Table 12.

TABLE 12

| | Pressure-Sensitive Adhesive Composition | | Outer Appearance after High-Temperature Storage | Re-adhesion property |
|---|---|---|---|---|
| | Fluoropolymer | Ionic Liquid | | |
| Example 28 | Fluoroelastomer V | IL#17 | not changed | present |
| Example 29 | Fluoroelastomer I/ Fluoroelastomer V | IL#17 | not changed | present |
| Comparative Example 18 | acrylic-based pressure-sensitive adhesive | | not changed | absent |
| Comparative Example 19 | silicone-based pressure-sensitive adhesive | | foamed | (not evaluated due to occurrence of cohesive failure) |

In the pressure-sensitive adhesive compositions of Examples 28 and 29, even after high-temperature storage, the outer appearance was not changed and the re-adhesion property was present. On the other hand, in Comparative Example 18 (acrylic pressure-sensitive adhesive), the re-adhesion property was lost, and in Comparative Example 19 (silicone-based pressure-sensitive adhesive), foaming was observed in the pressure-sensitive adhesive and when the tape was separated, the pressure-sensitive adhesive caused cohesive failure.

Example 30

A 80 liter reactor was charged with 52,000 grams of water, 40 grams of ammonium persulfate (APS, $(NH_4)_2S_2O_8$) and 160 grams of 50% aqueous solution of potassium phosphate dibasic ($K_2HPO_4$). The reactor was evacuated, the vacuum was broken and it was pressurized with nitrogen to 25 psi (0.17 MPa). This vacuum and pressurization was repeated three times. After removing oxygen, the reactor was heated to 80° C. and pressurized to 74 psi (0.51 MPa) with a blend of hexafluoropropylene (HFP), 1,4-diiodooctafluorobutane and decafluoro-3-methoxy-4-trifluoromethyl-pentane. To prepare the blend of hexafluoropropylene (HFP), 1,4-diiodooctafluorobutane and HFE 7500 (available under the trade designation "3M NOVEC" from 3M Company, St. Paul, Minn., USA), a 1-liter, stainless steel cylinder was evacuated and purged 3 times with $N_2$. After adding 1,4-diiodoocta-fluorobutane and HFE 7500 to the cylinder, HFP was added based on the amount of 1,4-diiodooctafluorobutane added. The blend was then attached to the reactor and was fed using a blanket of $N_2$. The blend contained 89.9 wt % of HFP, 2.5 wt % of 1,4-diiodooctafluorobutane and 7.6 wt % of HFE 7500. The reactor was then charged with vinylidene fluoride (VDF) and the above described blend of hexafluoropropylene (HFP), 1,4-diiodooctafluorobutane and HFE 7500, bringing reactor pressure to 200 psi (1.38 MPa). Total precharge of VDF and the blend of HFP, 1,4-diiodoocta-fluorobutane and HFE 7500 was 800 grams, and 1,536 grams, respectively. The reactor was agitated at 450 rpm. As reactor pressure dropped due to monomer consumption in the polymerization reaction, the blend of hexafluoropropyl-ene (HFP), 1,4-diiodooctafluorobutane and HFE 7500, and VDF was continuously fed to the reactor to maintain the pressure at 220 psi (1.52 MPa). The ratio of the blend to VDF was 0.651 by weight and no emulsifier was used for the polymerization. After 6.2 hours the monomer and blend feeds were discontinued and the reactor was cooled. The resulting dispersion had a solid content of 29.7 wt. % and a pH of 3.6. The dispersion particle size was 323 nm and total amount of dispersion was about 76,500 grams.

For the coagulation, 19.54 g of a mixture of 1 part by weight of $NH_4OH$ and 25 parts by weight of deionized water was added to 942 g of the latex made as described above. The pH of the mixture was 6.7. This mixture was added to 2,320 mL of a 5 wt % $MgCl_2$ in water solution. The crumb was recovered by filtering the coagulate through cheese cloth and gently squeezing to remove excess water. The crumb was returned to the coagulation vessel and rinsed with deionized water a total of 3 times. After the final rinse and filtration, the crumb was dried in a 130° C. oven for 16 hours. The resulting fluoropolymer raw gum had a Mooney viscosity of 2.5 at 121° C.

The fluoropolymer by neutron activation analysis (NAA) contained 0.63 wt % iodine. The fluoropolymer by FT-IR analysis contained 80.2 mol % copolymerized units of VDF and 19.8 mol % HFP.

Mooney viscosity or compound Mooney viscosity was determined in accordance with ASTM D1646-06 TYPE A by a MV 2000 instrument (available from Alpha Technologies, Ohio, USA) using large rotor (ML 1+10) at 121° C. Results are reported in Mooney units.

A fluoropolymer solution was prepared by dissolving a 50 grams of the fluoropolymer prepared as described above with a 50 grams of 2-butanone (MEK) and 1.5 grams of triallylisocyanurate (TAIC) co-agent or crosslinker (98%, obtained under the trade designation "TAIC" from Nippon Kasei, Japan), 1.0 grams of benzoyl peroxide (BP) (CAS RN 94-36-0), (available under the trade designation "LUPEROX A98" from Aldrich, Milwaukee, Wis., USA) and 15 grams of Ionic Liquid IL#10 (N-methyl-N,N,N-tri-n-butylammonium bis(trifluoromethanesulfonyl)imide in a glass jar. The glass jar was shock for 1 hour on a shaker. The solution was translucent.

The PTFE PSA sheet was prepared by coating the fluoropolymer solution composition onto a sodium etched PTFE film (100 micrometer) using a draw down square bar (available from PG&T Co.). The solution composition was applied a 6 mils (152.4 μm) thickness coating layer on the surface of the etched PTFE film substrate. The coated film was placed in an oven to remove solvent at 80° C. for 20 minutes. The thickness of the coating layer after drying was 3 mils (76.2 μm) and the coating layer was transparent or clear.

The polyimide/PTFE PSA laminate was prepared by applying polyimide film (available under the trade designation "Kapton" HK from E. I. du Pont de Nemours and Company, Wilmington, Del., USA) onto the sheet of PTFE PSA. Then the laminate was manually rolled-over with a rubber hand roller over the polyimide film and the laminate was cut into three 25.4 mm wide strips.

Figure 2:
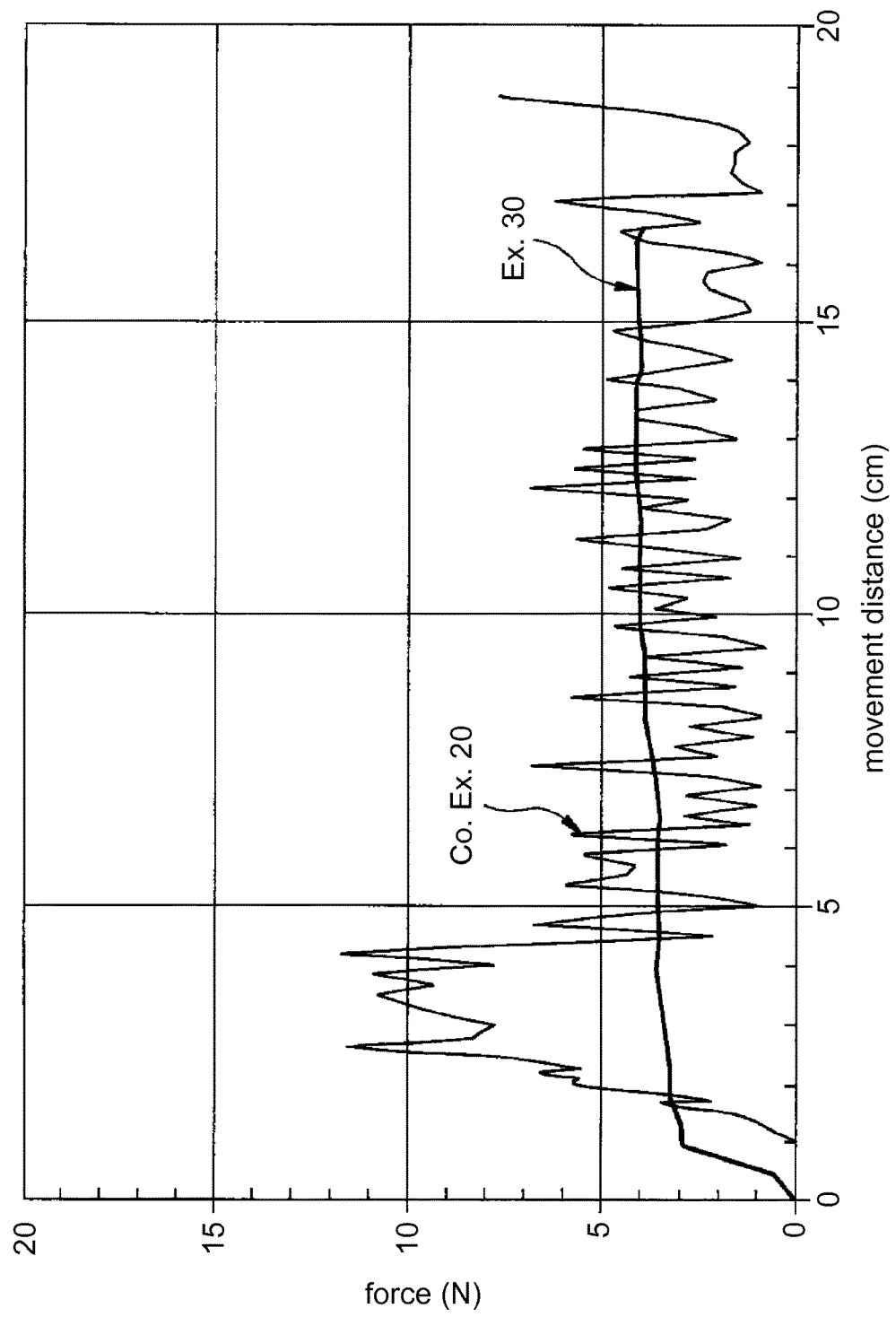
FIG. 2 is a chart showing the peel strengths of Example 30 and Comparative Example 20.

The peel or adhesion strength was measured on the three strips in accordance with ASTM D 1876 (T-peel test). A tester sold under the trade designation "INSTRON Model 1125 Tester", available from Instron Corp., set at a 100 mm/min. crosshead speed, was used as the test device. As the layers were separated the peel strength of the middle 80% of the sample was measured. The values from the first 20% and the last 20% distance of the crosshead were omitted. The value reported was an average of three testing samples. The average peel strength was 3.5 N/25 mm. The peel strength value was very consistent (FIG. 2).

Example 31

The PSA coated PTFE film as in Example 30 was further placed in an oven to cure the coating layer at 150° C. for 10 minutes. The coating layer after curing was transparent or clear.

Figure 3:
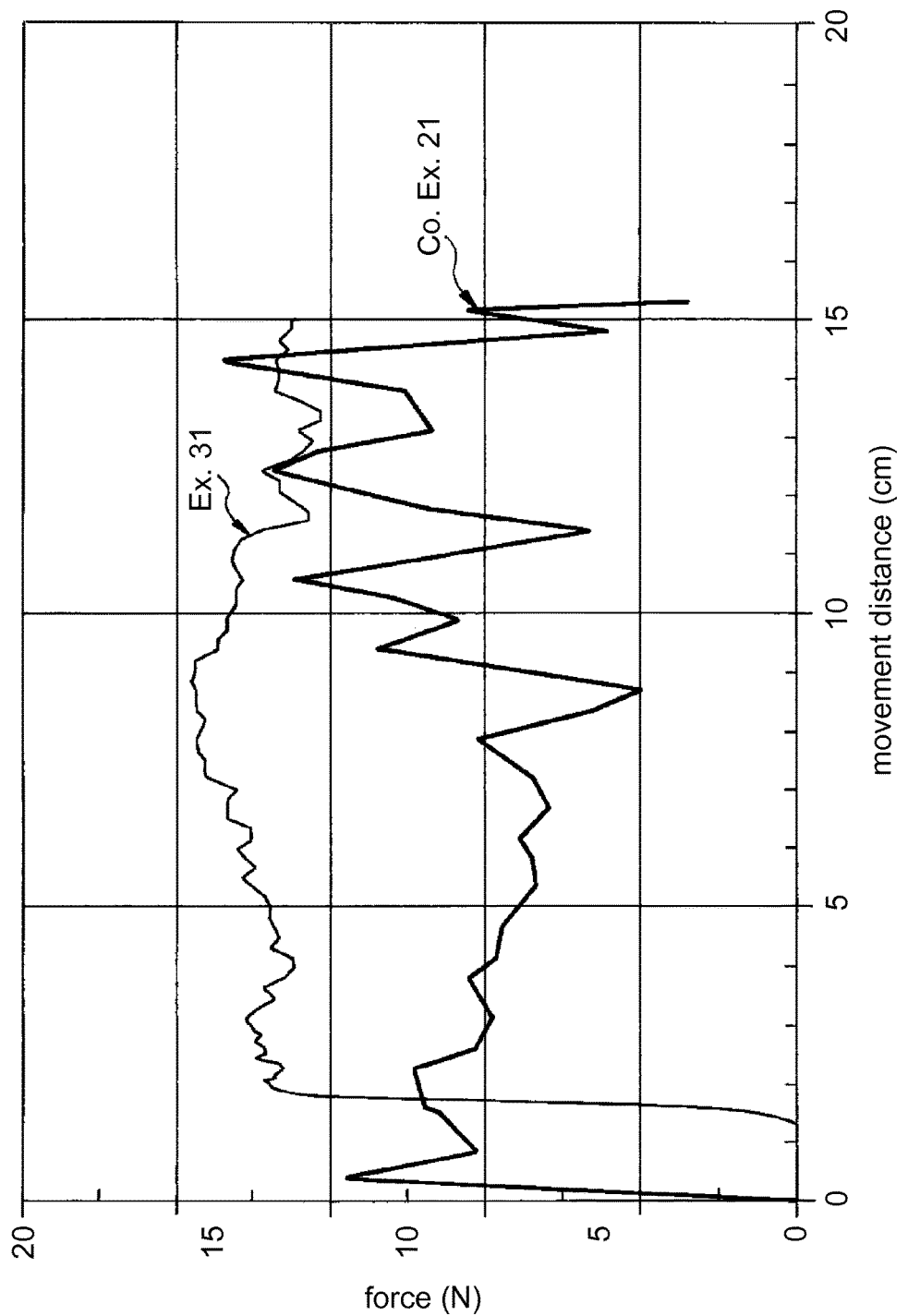
FIG. 3 is a chart showing the peel strengths of Example 31 and Comparative Example 21.

The polyimide/PTFE PSA laminate was prepared and the peel strength was measured as in Example 30. The average peel strength was 7.1 N/25 mm. The peel strength value was very consistent (FIG. 3).

Comparative Example 20

The fluoropolymer solution composition was prepared as in Example 30 except that the ionic liquid was not used. The polyimide/PTFE PSA laminate was prepared and the peel strength was measured as in Example 30. The average peel strength was 3.2 N/25 mm, but the peel strength value was very fluctuating between 1 and 6 N/25 mm (FIG. 2).

Comparative Example 21

The polyimide/PTFE PSA laminate was prepared and the peel strength was measured as in Comparative Example 20 except that PTFE PSA was further placed in an oven to cure the coating layer at 150° C. for 10 minutes. The average peel strength was 5.2 N/25 mm, but the peel strength value was very fluctuating between 2 and 7 N/25 mm (FIG. 3).

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A composition comprising (i) a fluoropolymer consisting of a fluoroelastomer having a first glass transition temperature and (ii) an ionic liquid, wherein a blend consisting of (i) and (ii) has a single, second glass transition temperature, which is different from the first glass transition temperature, wherein the ionic liquid consists of (a) an alkylammonium cation and (b) a bis-(trifluoromethanesulfonyl) imide anion, and wherein the composition comprises about 10 parts by mass or more of the ionic liquid per 100 parts total mass of the fluoropolymer and the ionic liquid.

2. The composition according to claim 1, wherein the fluoropolymer is a copolymer.

3. The composition according to claim 1, wherein the alkylmmonium cation is selected from N,N,N-trimethyl-N-propylammonium, N-methyl-N,N,N-tripropylammonium, N,N,N-trimethyl-N-butylammoniuim, N-methyl-N,N,N-tributylammonium, N,N,N-trimethyl-N-hexylammonium, N-methyl-N,N,N-trioctylammonium, N-methyl-N,N,N-tributylammonium, and a combination thereof.

4. The composition according to claim 1, wherein the ionic liquid and the fluoropolymer mixed together has a volume conductivity of greater than $1 \times 10^{-10}$ seimens/meter when measured at 23° C. and 100 volts following ASTM D 257-07.

5. An article comprising the composition according to claim 1.

6. The article of claim 5, wherein the article is an adhesive, a hose, a gasket, a seal, or a coating.

7. A method comprising blending (i) a fluoropolymer consisting of a fluoroelastomer having a first glass transition temperature and (ii) an ionic liquid wherein the ionic liquid consists of (a) an alkylammonium cation and (b) a bis-(trifluoromethanesulfonyl) imide anion, wherein the blend consisting of (i) and (ii) has a single, second glass transition temperature, which is different from the first glass transition temperature, and wherein the amount of the ionic liquid is about 10 parts by mass per 100 parts total mass of the fluoropolymer and the ionic liquid.

8. The composition according to claim 1, wherein the composition comprises about 25 parts by mass or more of the ionic liquid per 100 parts by mass of the fluoropolymer and the ionic liquid.

9. The composition according to claim 1, wherein the composition is substantially free of a conductive filler.

10. The composition according to claim 1, wherein the composition further comprises a peroxide curative.

11. The composition according to claim 1, wherein the composition comprises about 25 parts by mass or more of the ionic liquid per 100 parts by mass of the fluoropolymer.

12. The composition according to claim 1, wherein the fluoropolymer has a first solubility parameter and the ionic liquid has a second solubility parameter and the absolute difference between the first solubility parameter and the second solubility parameter is less than or equal to 4 $(cal/cc)^{1/2}$.

13. The composition according to claim 1, wherein the fluoropolymer is derived from at least one of tetrafluoroethylene (TFE), vinyl fluoride (VF), vinylidene fluoride (VDF), hexafluoropropylene (HFP), pentafluoropropylene, trifluoroethylene, trifluorochloroethylene (CTFE), perfluoromethyl vinyl ether (PMVE), perfluoropropyl vinyl ether (PPVE), and combinations thereof.

14. The composition according to claim 1, wherein the fluoropolymer is a TFE/propylene copolymer, a TFE/propylene/VDF copolymer, a VDF/HFP copolymer, a TFE/VDF/HFP copolymer, a TFE/PMVE copolymer, a TFE/$CF_2$=$CFOC_3F_7$ copolymer, a TFE/$CF_2$=$CFOCF_3$/$CF_2$=$CFOC_3F_7$ copolymer, a TFE/$CF_2$=$C(OC_2F_5)_2$ copolymer, a TFE/ethyl vinyl ether (EVE) copolymer, a TFE/butyl vinyl ether (BVE) copolymer, a TFE/EVE/BVE copolymer, a VDF/$CF_2$=$CFOC_3F_7$ copolymer, an ethylene/HFP copolymer, a CTFE/VDF copolymer, a TFE/VDF/PMVE/ethylene copolymer, or a TFE/VDF/$CF_2$=CFO$(CF_2)_3OCF_3$ copolymer.

15. The composition according to claim 1, wherein the composition is a solution or liquid dispersion.

16. The method according to claim 7, wherein the composition further comprises a solvent.

17. The composition according to claim 1, wherein the fluoropolymer is derived from vinylidene fluoride and hexafluoropropylene.

18. The method according to claim 7, wherein the fluoropolymer is derived from vinylidene fluoride and hexafluoropropylene.

19. The composition according to claim 1, wherein the alkylmmonium cation is selected from N-methyl-N,N,N-tributylammonium.

20. The method according to claim 7, wherein the alkylmmonium cation is selected from N-methyl-N,N,N-tributylammonium.

* * * * *